United States Patent
Shah et al.

(10) Patent No.: US 12,056,641 B2
(45) Date of Patent: Aug. 6, 2024

(54) SYSTEMS AND METHODS FOR ASSIGNING TASKS BASED ON PRIORITIES DETERMINED FOR THE TASKS

(71) Applicant: Lyft, Inc., San Francisco, CA (US)

(72) Inventors: Akash Gaurav Shah, Millbrae, CA (US); Cameron Philip Bruggeman, New York, NY (US); Linwei Chen, New York, NY (US); Emre Arda Sisbot, Jersey City, NJ (US); Andrew Jie Sun, New York, NY (US); Lucas Jon Van Houten, San Francisco, CA (US); Carter Robert Ren-Deh Wang, Shaker Heights, OH (US)

(73) Assignee: Lyft, Inc., San Francisco, CA (US)

( * ) Notice: Subject to any disclaimer, the term of this patent is extended or adjusted under 35 U.S.C. 154(b) by 734 days.

(21) Appl. No.: 17/100,642

(22) Filed: Nov. 20, 2020

(65) Prior Publication Data

US 2022/0164747 A1    May 26, 2022

(51) Int. Cl.
*G06Q 10/0631*   (2023.01)
*G01C 21/34*   (2006.01)
(Continued)

(52) U.S. Cl.
CPC ..... *G06Q 10/06316* (2013.01); *G01C 21/343* (2013.01); *G01C 21/3664* (2013.01);
(Continued)

(58) Field of Classification Search
CPC ..... G06Q 10/06316; G06Q 10/063112; G06Q 10/063114; G06Q 10/06315; G06Q 10/20;
(Continued)

(56) References Cited

U.S. PATENT DOCUMENTS

| | | | |
|---|---|---|---|
| 6,578,005 B1 * | 6/2003 | Lesaint | G06Q 10/06 705/7.14 |
| 2002/0025817 A1 * | 2/2002 | Karino | H04W 40/24 455/445 |

(Continued)

FOREIGN PATENT DOCUMENTS

GB    2426666 A * 11/2006    ......... H04W 80/045

OTHER PUBLICATIONS

Heineke et al. "Why micromobility is here to stay" (2020) (https://www.mckinsey.com/industries/automotive-and-assembly/our-insights/why-micromobility-is-here-to-stay) (Year: 2020).*

*Primary Examiner* — Sujay Koneru
(74) *Attorney, Agent, or Firm* — Baker Botts L.L.P.

(57) ABSTRACT

A micromobility transit vehicle service task management system and related methods are disclosed. In one embodiment, a system determines service tasks to be executed based on a level of availability of one or more micromobility transit vehicles. A value for each of the tasks is determined based on a cost to perform the task and value generated by an increase in availability of the one or more micromobility transit vehicles, for dynamic transportation matching, from execution of the task. The tasks may be prioritized into an order of execution that maximizes a total of the values of the tasks. The determined values of the tasks may be adjusted in the prioritization of the tasks based on the order of execution of the tasks. A navigational task route may be generated based on the prioritized tasks and assigned to a technician device to guide a technician to each of the tasks.

20 Claims, 16 Drawing Sheets

(51) Int. Cl.
  *G01C 21/36* (2006.01)
  *G06Q 10/20* (2023.01)
  *G06Q 30/0204* (2023.01)
  *G06Q 30/0645* (2023.01)
  *G06Q 30/08* (2012.01)
  *G07C 5/00* (2006.01)
  *G08G 1/01* (2006.01)
  *G06Q 50/40* (2024.01)

(52) U.S. Cl.
  CPC ............. *G06Q 10/063112* (2013.01); *G06Q 10/063114* (2013.01); *G06Q 10/06312* (2013.01); *G06Q 10/06315* (2013.01); *G06Q 10/20* (2013.01); *G06Q 30/0205* (2013.01); *G07C 5/008* (2013.01); *G08G 1/0129* (2013.01); *G06Q 30/0645* (2013.01); *G06Q 30/08* (2013.01); *G06Q 50/40* (2024.01)

(58) Field of Classification Search
  CPC .... G06Q 20/0205; G06Q 20/08; G06Q 50/30; G01C 21/343; G01C 21/3664; G07C 5/008; G08G 1/0219
  See application file for complete search history.

(56) References Cited

U.S. PATENT DOCUMENTS

| | | | | |
|---|---|---|---|---|
| 2003/0050789 A1* | 3/2003 | Hasson | G06Q 10/10 | 705/30 |
| 2004/0243664 A1* | 12/2004 | Horstemeyer | G08G 1/20 | 709/200 |
| 2005/0207876 A1* | 9/2005 | Springwater | E04H 6/24 | 414/231 |
| 2007/0173993 A1* | 7/2007 | Nielsen | G06Q 10/06 | 701/33.4 |
| 2008/0235688 A1* | 9/2008 | Panttaja | G06Q 30/0205 | 705/7.34 |
| 2009/0234722 A1* | 9/2009 | Evevsky | G06Q 30/02 | 705/14.1 |
| 2013/0041941 A1* | 2/2013 | Tomasic | G01C 21/20 | 709/203 |
| 2013/0090963 A1* | 4/2013 | Sharma | G06Q 10/063112 | 705/7.13 |
| 2015/0339595 A1* | 11/2015 | Soutter | G06Q 30/0207 | 705/5 |
| 2016/0117726 A1* | 4/2016 | Lee | G06Q 30/0633 | 705/14.53 |
| 2016/0196701 A1* | 7/2016 | Strother | G06Q 10/06 | 701/29.3 |
| 2017/0200320 A1* | 7/2017 | Tomer | G07B 15/00 | |
| 2017/0349195 A1* | 12/2017 | Benedict | B61L 27/70 | |
| 2018/0068277 A1* | 3/2018 | Okuda | G06Q 10/1097 | |
| 2019/0034254 A1* | 1/2019 | Nataraj | G06F 11/0709 | |
| 2019/0172082 A1* | 6/2019 | Ganti Mahapatruni | G06N 5/01 | |
| 2019/0272500 A1* | 9/2019 | Haque | G06Q 50/30 | |
| 2019/0295014 A1* | 9/2019 | Fagnant | G06Q 10/06311 | |
| 2019/0318549 A1* | 10/2019 | Zeira | G06Q 10/1097 | |
| 2019/0324446 A1* | 10/2019 | VanderZanden | G05D 1/0291 | |
| 2019/0340546 A1* | 11/2019 | Goldman-Shenhar | G06Q 10/02 | |
| 2019/0346840 A1* | 11/2019 | Valeri | G05D 1/0088 | |
| 2020/0086939 A1* | 3/2020 | Iseman | B62K 3/002 | |
| 2021/0053643 A1* | 2/2021 | Murphy | B62K 23/04 | |
| 2021/0181762 A1* | 6/2021 | Zhao | G05D 1/0291 | |
| 2021/0256437 A1* | 8/2021 | Stayner | G06Q 10/06311 | |
| 2021/0304559 A1* | 9/2021 | Cupersmith | B25J 19/023 | |

* cited by examiner

SYSTEMS AND METHODS FOR ASSIGNING TASKS BASED ON PRIORITIES DETERMINED FOR THE TASKS

TECHNICAL FIELD

One or more embodiments of the present disclosure relate generally to micromobility transit vehicles and more particularly, for example, to systems and methods for creating, prioritizing, and assigning service tasks for micromobility transit vehicle fleets.

BACKGROUND

Contemporary transportation services may incorporate a variety of different types of vehicles, including motorized or electric scooters and bicycles designed to transport one or two people at once (collectively, micromobility transit vehicles). Such micromobility transit vehicles provide an additional dimension of transportation flexibility, particularly when such vehicles are incorporated into a dynamic transportation matching system that links requestors or users to transit vehicles for use. Micromobility transit vehicle fleets (e.g., shareable/rentable micromobility transit vehicles) may be serviced by a fleet manager/servicer for use by the public as one or more types of transportation modalities offered by the dynamic transportation matching system. These shareable/rentable vehicles require servicing to maintain functionality and meet user demand. For example, a micromobility transit vehicle may need a battery service or a tire service to further serve as a shareable/rentable vehicle. Further, micromobility transit vehicles may need to be redistributed between several locations to enhance their availability to users when using the dynamic transportation matching system. Managing service tasks for a large micromobility transit vehicle fleet deployed in operation is labor and cost intensive as the vehicles may be rented and moved around the urban environment by users. There is a need to improve upon service task and operation management technology by implementing an automated platform that allows for dynamic task scheduling using real-time and learned historic data to increase productivity and efficiency in servicing the micromobility transit vehicle fleet and provide for greater availability of micromobility transit vehicles in a dynamic transportation matching system.

SUMMARY

Techniques are disclosed for systems and methods directed to creating, prioritizing, and assigning executable service tasks for micromobility transit vehicle fleets. In accordance with one or more embodiments, a micromobility transit vehicle service task management system includes a non-transitory memory and one or more hardware processors coupled to the non-transitory memory and configured to read instructions from the non-transitory memory to cause the system to perform operations. The operations may include determining one or more tasks to be executed based on a level of availability of one or more micromobility transit vehicles (e.g., a micromobility transit vehicle fleet) for dynamic transportation matching. The operations may further include determining a value for each of the tasks based on a cost to perform the task and an increase in the availability of the one or more micromobility transit vehicles by an execution of the task. The operations may further include prioritizing the one or more tasks into an order of execution that maximizes a total of the values of the tasks, where the values of the tasks are adjusted in the prioritizing operation based on the order of execution. That is, the values of the tasks may be adjusted relative to the sequence of the tasks so that some orders of priority provide for greater overall value than others. The operations may further include generating a navigational task route based on the prioritized one or more tasks, where the navigational task route is assignable to a technician device corresponding to a technician for the execution of the prioritized tasks.

In accordance with one or more embodiments, a method for micromobility transit vehicle service task generation is disclosed. The method may include determining a plurality of tasks to be executed based on a level of availability of one or more micromobility transit vehicles for dynamic transportation matching. The method may further include determining a value for each of the tasks based on a cost to perform the task and an increase in the availability of the one or more micromobility transit vehicles in a dynamic transportation matching system should the task be executed. The method may further include selecting one or more tasks, from the plurality of tasks, that exceed a threshold value warranting the execution of the one or more tasks. The method may further include prioritizing the one or more tasks into an order of execution that maximizes a total of the values of the tasks, where the values of the tasks may be adjusted during the prioritization to determine the optimal order of execution. The method may further include generating a navigational task route based on the prioritized one or more tasks. The navigational task route may be assignable to a technician (e.g., an operations technician mobile device or operations technician vehicle) to guide the technician to each of the prioritized task locations.

In accordance with one or more embodiments, disclosed herein is a non-transitory machine-readable medium having stored thereon machine-readable instructions executable to cause a machine to perform operations. The operations may include determining one or more tasks to be executed based on an availability of one or more micromobility transit vehicles. The operations may further include determining a value for each of the tasks based on a cost to perform the task and an increase in the availability of the one or more micromobility transit vehicles by an execution of the task. The operations may further include prioritizing the one or more tasks into an order of execution that maximizes a total of the values of the tasks, where the values of the tasks may be adjusted in the prioritizing based on the order of execution. The operations may further include generating a plurality of navigational task routes based on the prioritized one or more tasks, where each of the navigational task routes is assignable to one of a plurality of technician devices corresponding to technicians for the execution of the prioritized tasks.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments of the invention. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
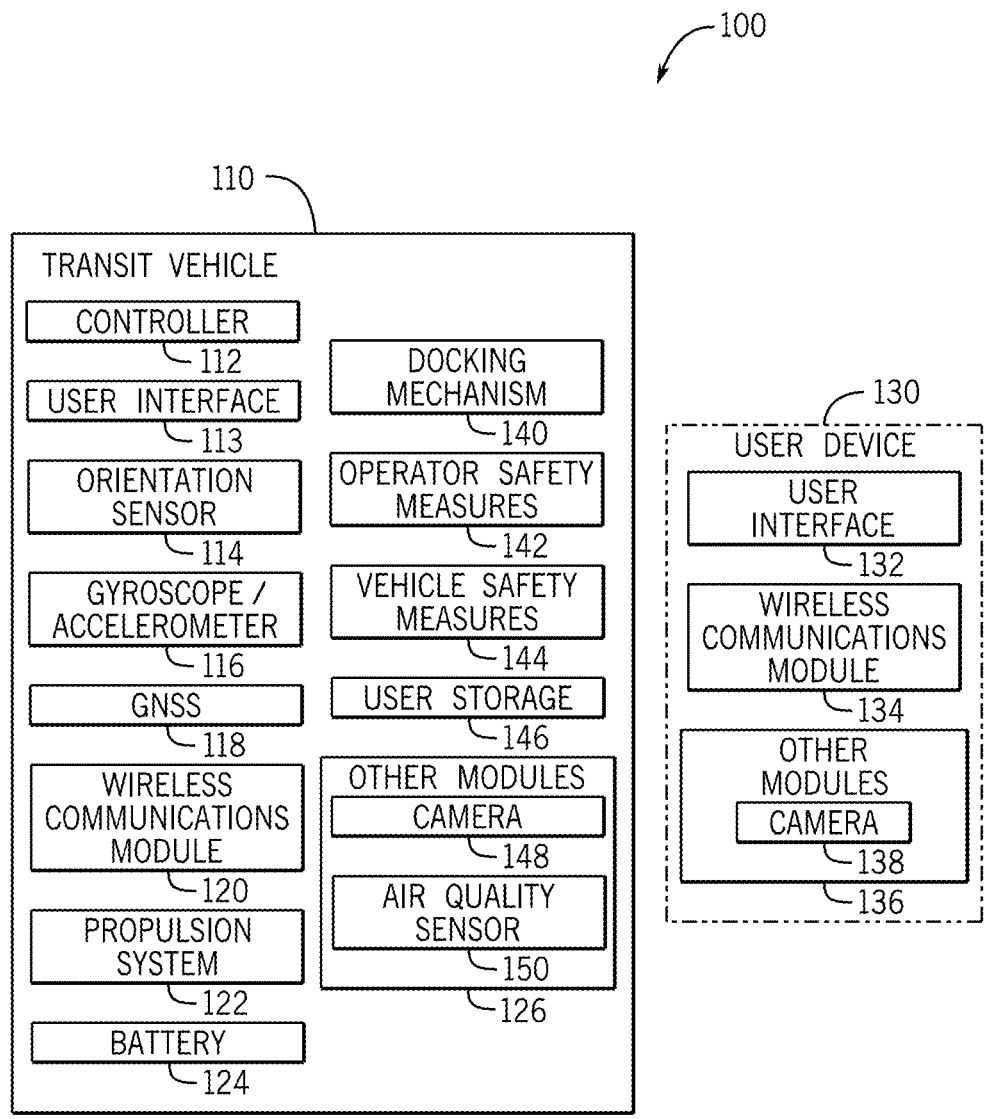
FIG. 1 illustrates a block diagram of a portion of a dynamic transportation matching system including a transit vehicle in accordance with an embodiment of the disclosure.

Techniques are disclosed for systems and methods directed to creating, prioritizing, and assigning executable service tasks for micromobility transit vehicle fleets. For example, a dynamic transportation matching system may link requestors or users to the micromobility transit vehicles for use as an additional dimension of transportation flexibility. In some embodiments, micromobility transit vehicle fleets (e.g., shareable/rentable micromobility transit vehicles incorporated into the dynamic transportation matching system) may be serviced by a fleet manager/servicer for use by the public along with several other types of transportation modalities and services offered by the dynamic transportation matching system such as vehicle rideshare, vehicle rentals, autonomous taxi vehicles, and subscription-based vehicle programs. It will be appreciated that advantages of the present disclosure in creating, prioritizing, and assigning executable service tasks may be applied to the entire ecosystem of transportation modalities and services managed by the dynamic transportation matching system to provide value in efficient and cost-effective operation.

Shareable/rentable vehicles may require servicing and management to maintain functionality and meet user ride request demand. For example, micromobility transit vehicles may need maintenance and repair service or a battery swap to further serve as a shareable/rentable vehicle. As another example, micromobility transit vehicles may need to be redistributed (e.g., moved, dropped-off) among several locations to provide users with more availability/rideability when using a dynamic transportation matching service. In a further example, micromobility transit vehicles may need to be picked up and returned to a depot for charging or maintenance and repair.

Servicing and managing a large micromobility transit vehicle fleet deployed in operation may require ongoing tasks that are labor and cost intensive as the micromobility transit vehicles may be rented and moved around by users as they use the micromobility transit vehicle for rides, such that the distribution of available vehicles may not satisfy current or projected ride request demands. Since the micromobility transit vehicles can be moved around an environment by users, there exists a dynamic challenge to schedule tasks that allow a technician to efficiently travel to the micromobility transit vehicles' changing locations and execute the tasks. Thus, there is a need to improve upon service and operation management technology by implementing an automated platform that allows for dynamic task scheduling that employs real-time and learned historic data to increase productivity and efficiency in servicing and managing a micromobility transit vehicle fleet and consequently provide for greater availability/rideability of micromobility transit vehicles in a dynamic transportation matching system.

In an embodiment of the present disclosure, a system (e.g., a dynamic transportation servicing system or a dynamic transportation management system that may be or may be part of the dynamic transportation matching system) determines one or more tasks to recommend be executed by a technician based on a level of availability/rideability of a micromobility transit vehicle fleet (e.g., one or more micromobility transit vehicles) for dynamic transportation matching. In some embodiments, the availability/rideability may be defined to include how accessible a micromobility transit vehicle currently is for users as part of a dynamic transportation matching system that matches micromobility transit vehicles to ride-requesting users. For example, a micromobility transit vehicle that is within a certain proximity (e.g., 400 meters) to a current location of a user (or when and where there has historically been a sufficiently high user demand) and available for use (e.g., not blocked due to low battery or requiring maintenance service) may be considered more accessible. Conversely, where there are no micromobility transit vehicles (or micromobility transit vehicles are blocked for use) within a certain proximity to the user, the micromobility transit vehicles may be considered less accessible. In some embodiments, the system may determine the one or more tasks to recommend be executed based on historic user ride request demand as further discussed in the present disclosure.

The tasks determined by the system may include maintenance service tasks, repair tasks, move tasks, drop-off tasks, pick-up tasks (e.g., picked up to be returned to a depot), battery swap tasks, and so forth. In some embodiments, the system may determine which tasks to recommend be executed based on status updates received from the micromobility transit vehicles that are in operation. For example, micromobility transit vehicles may have various sensors and computer processing units capable of determining (i) when a component of the micromobility transit vehicle requires maintenance, a check-up, repair, or pick-up, and (ii) a battery level of a battery installed in the micromobility transit vehicle. The micromobility transit vehicles may include this self-diagnosis information in the status updates and periodically send the status updates to the system, automatically send the status updates to the system when the vehicle needs servicing (such as a battery power level below a certain threshold), and/or send the status updates upon request by the system.

The system may determine types of tasks, such as move and drop-off tasks, to recommend be executed based on historic user ride request demand at locations and/or real-time geolocations of micromobility transit vehicles in operation. For example, the system may predict ride demand at a certain location will increase during a period of the day and the number of micromobility transit vehicles currently at the location will not be sufficient without intervention. Thus, the system may recommend that a drop-off task or move task be executed to supply the location with a sufficient number of micromobility transit vehicles to meet the predicted ride demand, such as before and/or after an event (e.g., a concert, a sporting event, a conference, and the like). Similarly, the system may evaluate current user ride request demand at a location and identify that the current ride request demand exceeds the current number of micromobility transit vehicles available at the location, and thus may recommend that a drop-off task or move task be executed to meet the current demand at the location.

In some embodiments, the system may have predefined criteria for certain locations such as stations where micromobility transit vehicles may be reserved and/or returned. For example, the predefined criteria may require that the station or neighboring stations in the aggregate do not fall below a threshold number of micromobility transit vehicles available for use at the station during a time period. In this regard, the system may monitor the arrival and departure rates (e.g., inflow and outflow) of micromobility transit vehicles at the station or aggregated stations to determine if drop-off or move tasks should be recommended to be executed so that the predefined criteria can be satisfied. In some cases, the predefined criteria may correspond to a service agreement related to the provision of micromobility transit vehicles at a station(s) for public use.

In various embodiments, the system may determine a value for each of the determined tasks based on a cost to perform the task and an increase or change in the availability/rideability of the micromobility transit vehicle fleet for dynamic transportation matching. For example, the cost to perform a task may include a cost associated with an amount of time that may be required to execute the task, an amount of time that may be required to travel to the task location and park a technician vehicle before executing the task, and a distance that may be required to travel to the task location from a technician's location (e.g., technician device GPS location). The value from the execution of a task may be further based on an increase or change in the availability of the one or more micromobility transit vehicles for the dynamic transportation matching system to select for matching with a user in response to a user request to ride a micromobility transit vehicle. For example, when a drop-off task, move task, pick-up task, maintenance service task, and/or battery swap task is executed, the pool of available micromobility transit vehicles may expand for the dynamic transportation matching system to match with users.

According to some embodiments, the system may prioritize the tasks into an order of execution that maximizes a total of the values of the tasks. The prioritization of the tasks may be based on real-time constraints acquired by the system such as a number of technicians currently located in a geographical area and available to execute the tasks, the carrying capacity of the technicians' vehicles, the locations of the tasks relative to each other, the current tasks that may be in progress by the technicians (e.g., technician bandwidth to take on additional tasks), technician shift durations, and whether the order of the tasks should end at a warehouse depot (e.g. the end of a technician shift should end at a warehouse depot or micromobility transit vehicles are to be returned to the warehouse depot). In some embodiments, the system may prioritize the tasks within the constraints and to minimize costs in a manner that provides the most cost-effective overall value. In this regard, the values of the tasks may be adjusted during the prioritization of the tasks based on the sequence in which they are performed. For example, a task may have more value if executed immediately rather than executed last as the value of the task may have a large timeliness factor to meet current (e.g., real-time) or predicted ride demand. Thus, as discussed further herein, the system may implement optimization processes in determining the order of priority that provides an optimal value from the execution of the tasks.

Based on the prioritized tasks, the system may generate a navigational task route. The system may assign the navigational task route to a technician (e.g., technician device or vehicle) for the execution of the prioritized tasks. In some implementations, the technician may receive the navigational task route and tasks thereof on a device such as a mobile device or onboard vehicle computing device, where the navigational task route and tasks are displayed on a graphical user interface of the device to guide the technician to each of the tasks, for example. Prioritized tasks that have been included in a navigational task route may be considered routed by the system. A subset of the routed tasks may include an in-progress task, which may be a task that a technician has started but has not completed such as when the technician is driving to the task location according to an embodiment. Another subset of the routed tasks may include reserved tasks, which may be immediately upcoming tasks on a technician's task route (e.g., the next two immediately upcoming tasks) according to an embodiment.

In various embodiments, the navigational task route may be updated based on newly created tasks and/or previously identified tasks that did not have a great enough value to be included in the navigational task route. For example, the system may determine additional tasks to recommend be executed and create new tasks based on the determination. These newly created tasks may be considered available to the system for refreshing task operations. During a task refresh, the system may determine a value for the newly created task and compare the value of the newly created task to the routed tasks on the navigational task route. For example, the new tasks may be compared to the routed tasks but not reserved nor in-progress tasks on the navigational task route as the upcoming tasks should not be disturbed for the technician. In some cases, where the value of a new task would provide for a greater value in the prioritized order of tasks in the navigational task route, the system may replace a routed task with the new task. In other cases, the system may determine that the new task can simply be added to the navigational task route to provide for additional value without detracting from the efficiency of the navigational task route.

It is noted that the value of the routed tasks may change with changing real-time conditions for the dynamic transportation matching system, thus a navigational task route that is also changed in correlation to the changing conditions may provide flexibility and allow for optimization of the value and efficiency in executing the tasks. Thus, when the system performs task refreshing, which may occur periodically such as every ten minutes or on demand, such as a subsequent to a demand prediction or subsequent to a real-time indication of a change in demand, the system may create new tasks and evaluate whether current navigational task routes should be adjusted (e.g., tasks added, replaced, removed, changed, etc.) to provide for greater value in terms of cost efficient task management to increase availability/ rideability of micromobility transit vehicles in a dynamic transportation matching system.

One or more features or functions described herein may be included or omitted, or enabled or disabled on an opt-in basis, particularly for optimizing rider safety, comfort, and reliability. For example, a rider may choose to turn on or turn off, or use or not use, one or more of the features or functions described herein for their personal safety and comfort. In some instances, these features or functions may be turned on temporarily and/or turned on automatically to maximize rider safety and comfort, among various other possibilities.

Now referring to the figures, FIG. 1 illustrates a block diagram of a portion of a dynamic transportation matching system 100 (e.g., system 100) including a transit vehicle 110 in accordance with an embodiment of the disclosure. In the embodiment shown in FIG. 1, system 100 includes transit vehicle 110 and an optional user device 130. In general, transit vehicle 110 may be a passenger vehicle designed to transport a single person (e.g., a micromobility transit vehicle, a transit bike and scooter vehicle, or the like) or a group of people (e.g., a typical car or truck). More specifically, transit vehicle 110 may be implemented as a motorized or electric kick scooter, bicycle, and/or motor scooter designed to transport one or perhaps two people at once typically on a paved road (collectively, micromobility transit vehicles), as a typical automobile configured to transport up to 4, 7, or 10 people at once, or according to a variety of different transportation modalities (e.g., transportation mechanisms). Transit vehicles similar to transit vehicle 110 may be owned, managed, and/or serviced primarily by a fleet manager/servicer providing transit vehicle 110 for use by the public as one or more types of transportation modalities offered by a dynamic transportation matching system, for example. In some embodiments, transit vehicles similar to transit vehicle 110 may be owned, managed, and/or serviced by a private owner using the dynamic transportation matching system to match their vehicle to a transportation request, such as with ridesharing or ridesourcing applications typically executed on a mobile user device, such as user device 130 as described herein. User device 130 may be a smartphone, tablet, near field communication (NFC) or radio-frequency identification (RFID) enabled smart card, or other personal or portable computing and/or communication device that may be used to facilitate rental and/or operation of transit vehicle 110.

As shown in FIG. 1, transit vehicle 110 may include one or more of a controller 112, a user interface 113, an orientation sensor 114, a gyroscope/accelerometer 116, a global navigation satellite system (GNSS) receiver 118, a wireless communications module 120, a camera 148, a propulsion system 122, an air quality sensor 150, and other modules 126. Operation of transit vehicle 110 may be substantially manual, autonomous, and/or partially or completely controlled by user device 130, which may include one or more of a user interface 132, a wireless communications module 134, a camera 138, and other modules 136. In other embodiments, transit vehicle 110 may include any one or more of the elements of user device 130. In some embodiments, one or more of the elements of system 100 may be implemented in a combined housing or structure that can be coupled to or within transit vehicle 110 and/or held or carried by a user of system 100.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of transit vehicle 110 and/or other elements of system 100, for example. Such software instructions may also implement methods for processing images such as those provided by camera 148, and/or other sensor signals or data, determining sensor information, providing user feedback (e.g., through user interface 113 or 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user via user interface 113 or 132. In some embodiments, controller 112 may be integrated with one or more other elements of transit vehicle 110, for example, or distributed as multiple logic devices within transit vehicle 110 and/or user device 130.

In some embodiments, controller 112 may be configured to substantially continuously monitor and/or store the status of and/or sensor data provided by one or more elements of transit vehicle 110 and/or user device 130, such as the position and/or orientation of transit vehicle 110 and/or user device 130, for example, and the status of a communication link established between transit vehicle 110 and/or user device 130. Such communication links may be established and then provide for transmission of data between elements of system 100 substantially continuously throughout operation of system 100, where such data includes various types of sensor data, control parameters, and/or other data.

User interface 113 of transit vehicle 110 may be implemented as one or more of a display, a touch screen, a keyboard, a mouse, a joystick, a knob, a steering wheel, a yoke, and/or any other device capable of accepting user input and/or providing feedback to a user. In various embodiments, user interface 113 may be adapted to provide user input (e.g., as a type of signal and/or sensor information transmitted by wireless communications module 134 of user device 130) to other devices of system 100, such as controller 112. User interface 113 may also be implemented with one or more logic devices (e.g., similar to controller 112) that may be adapted to store and/or execute instructions, such as software instructions, implementing any of the various processes and/or methods described herein. For example, user interface 113 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 113 may be adapted to display a time series of various sensor information and/or other parameters as part of or overlaid on a graph or map, which may be referenced to a position and/or orientation of transit vehicle 110 and/or other elements of system 100. For example, user interface 113 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 113 may be adapted to accept user input including a user-defined target heading, waypoint, route, and/or orientation, for example, and to generate control signals to cause transit vehicle 110 to move according to the target heading, route, and/or orientation. In other embodiments, user interface 113 may be adapted to accept user input modifying a control loop parameter of controller 112, for example.

Orientation sensor 114 may be implemented as one or more of a compass, float, accelerometer, and/or other device capable of measuring an orientation of transit vehicle 110 (e.g., magnitude and direction of roll, pitch, and/or yaw, relative to one or more reference orientations such as gravity and/or Magnetic North), camera 148, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of transit vehicle 110 and/or other elements of system 100 and providing such measurements as sensor signals and/or data that may be communicated to other devices of system 100 (e.g., user interface 132, controller 112).

GNSS receiver 118 may be implemented according to any global navigation satellite system, including a GPS, GLONASS, and/or Galileo based receiver and/or other device capable of determining absolute and/or relative position of transit vehicle 110 (e.g., or an element of transit vehicle 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS receiver 118 may include an altimeter, for example, or may be used to provide an absolute altitude.

Wireless communications module 120 may be implemented as any wireless communications module configured to transmit and receive analog and/or digital signals between elements of system 100. For example, wireless communications module 120 may be configured to directly or indirectly receive control signals and/or data from user device 130 and provide them to controller 112 and/or propulsion system 122. In other embodiments, wireless communications module 120 may be configured to receive images and/or other sensor information (e.g., still images or video images) and relay the sensor data to controller 112 and/or user device 130. In some embodiments, wireless communications module 120 may be configured to support spread spectrum transmissions, for example, and/or multiple simultaneous communications channels between elements of system 100. Wireless communication links formed by wireless communications module 120 may include one or more analog and/or digital radio communication links, such as WiFi, Bluetooth, NFC, RFID, LTE, and others, as described herein, and may be direct communication links established between elements of system 100, for example, or may be relayed through one or more wireless relay stations configured to receive and retransmit wireless communications. In various embodiments, wireless communications module 120 may be configured to support wireless mesh networking, as described herein.

In some embodiments, wireless communications module 120 may be configured to be physically coupled to transit vehicle 110 and to monitor the status of a communication link directly or indirectly established between transit vehicle 110 and/or user device 130. Such status information may be provided to controller 112, for example, or transmitted to other elements of system 100 for monitoring, storage, or further processing, as described herein. In addition, wireless communications module 120 may be configured to determine a range to another device, such as based on time of flight, and provide such range to the other device and/or controller 112. Communication links established by communication module 120 may be configured to transmit data between elements of system 100 substantially continuously throughout operation of system 100, where such data includes various types of sensor data, control parameters, and/or other data, as described herein.

Propulsion system 122 may be implemented as one or more motor-based propulsion systems, and/or other types of propulsion systems that can be used to provide motive force to transit vehicle 110 and/or to steer transit vehicle 110. In some embodiments, propulsion system 122 may include elements that can be controlled (e.g., by controller 112 and/or user interface 113) to provide motion for transit vehicle 110 and to provide an orientation for transit vehicle 110. In various embodiments, propulsion system 122 may be implemented with a portable power supply, such as a battery. In some embodiments, propulsion system 122 may be implemented with a combustion engine/generator and fuel supply.

For example, in some embodiments, such as when propulsion system 122 is implemented by an electric motor (e.g., as with many micromobility transit vehicles), transit vehicle 110 may include battery 124. Battery 124 may be implemented by one or more battery cells (e.g., lithium ion battery cells) and be configured to provide electrical power to propulsion system 122 to propel transit vehicle 110, for example, as well as to various other elements of system 100, including controller 112, user interface 113, and/or wireless communications module 120. In some embodiments, battery 124 may be implemented with its own safety measures, such as thermal interlocks and a fire-resistant enclosure, for example, and may include one or more logic devices, sensors, and/or a display to monitor and provide visual feedback of a charge status of battery 124 (e.g., a charge percentage, a low charge indicator, etc.).

Other modules 126 may include other and/or additional sensors, actuators, communications modules/nodes, and/or user interface devices, for example, and may be used to provide additional environmental information related to operation of transit vehicle 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), and/or other environmental sensors providing measurements and/or other sensor signals that can be displayed to a user and/or used by other devices of system 100 (e.g., controller 112) to provide operational control of transit vehicle 110 and/or system 100. In further embodiments, other modules 126 may include a light, such as a headlight or indicator light, and/or an audible alarm, both of which may be activated to alert passersby to possible theft, abandonment, and/or other critical statuses of transit vehicle 110. In particular, and as shown in FIG. 1, other modules 126 may include camera 148 and/or air quality sensor 150.

Camera 148 may be implemented as an imaging device including an imaging module including an array of detector elements that can be arranged in a focal plane array. In various embodiments, camera 148 may include one or more logic devices (e.g., similar to controller 112) that can be configured to process imagery captured by detector elements of camera 148 before providing the imagery to communications module 120 or other elements of the system 100. More generally, camera 148 may be configured to perform any of the operations or methods described herein, at least in part, or in combination with controller 112 and/or user interface 113 or 132. In some embodiments, camera 148 may be a visible light imager and/or thermal imager.

In various embodiments, air quality sensor 150 may be implemented as an air sampling sensor configured to determine an air quality of an environment about transit vehicle 110 and provide corresponding air quality sensor data. Air quality sensor data provided by air quality sensor 150 may include particulate count, methane content, ozone content, and/or other air quality sensor data associated with common street level sensitivities and/or health monitoring typical when in a street level environment, such as that experienced when riding on a typical micromobility transit vehicle, as described herein.

Transit vehicles implemented as micromobility transit vehicles may include a variety of additional features designed to facilitate fleet management and user and environmental safety. For example, as shown in FIG. 1, transit vehicle 110 may include one or more of docking mechanism 140, operator safety measures 142, vehicle security device 144, and/or user storage 146, as described in more detail herein by reference to FIGS. 3A-C.

User interface 132 of user device 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by wireless communications module 134 of user device 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of transit vehicle 110 and/or other elements of system 100. For example, user interface 132 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 132 may be adapted to accept user input including a user-defined target heading, waypoint, route, and/or orientation, for example, and to generate control signals to cause transit vehicle 110 to move according to the target heading, route, and/or orientation. In other embodiments, user interface 132 may be adapted to accept user input modifying a control loop parameter of controller 112, for example.

Wireless communications module 134 may be implemented as any wireless communications module configured to transmit and receive analog and/or digital signals between elements of system 100. For example, wireless communications module 134 may be configured to directly or indirectly transmit control signals from user interface 132 to wireless communications module 120 or 134. In some embodiments, wireless communications module 134 may be configured to support spread spectrum transmissions, for example, and/or multiple simultaneous communications channels between elements of system 100. In various embodiments, wireless communications module 134 may be configured to monitor the status of a communication link established between user device 130 and/or transit vehicle 110 (e.g., including packet loss of transmitted and received data between elements of system 100, such as with digital communication links), and/or determine a range to another device, as described herein. Such status information may be provided to user interface 132, for example, or transmitted to other elements of system 100 for monitoring, storage, or further processing, as described herein. In various embodiments, wireless communications module 134 may be configured to support wireless mesh networking, as described herein.

Other modules 136 of user device 130 may include other and/or additional sensors, actuators, communications modules/nodes, and/or user interface devices used to provide additional environmental information associated with user device 130, for example. In some embodiments, other modules 136 may include a humidity sensor, a wind and/or water temperature sensor, a barometer, a radar system, a visible spectrum camera, an infrared camera, a GNSS receiver, and/or other environmental sensors providing measurements and/or other sensor signals that can be displayed to a user and/or used by other devices of system 100 (e.g., controller 112) to provide operational control of transit vehicle 110 and/or system 100 or to process sensor data to compensate for environmental conditions. As shown in FIG. 1, other modules 136 may include camera 138.

Camera 138 may be implemented as an imaging device including an imaging module including an array of detector elements that can be arranged in a focal plane array. In various embodiments, camera 138 may include one or more logic devices (e.g., similar to controller 112) that can be configured to process imagery captured by detector elements of camera 138 before providing the imagery to communications module 120. More generally, camera 138 may be configured to perform any of the operations or methods described herein, at least in part, or in combination with controller 138 and/or user interface 113 or 132.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 and/or elements of other systems similar to system 100 using a variety of wired and/or wireless communication techniques, including voltage signaling, Ethernet, WiFi, Bluetooth, Zigbee, Xbee, Micronet, Near-field Communication (NFC) or other medium and/or short range wired and/or wireless networking protocols and/or implementations, for example. In such embodiments, each element of system 100 may include one or more modules supporting wired, wireless, and/or a combination of wired and wireless communication techniques, including wireless mesh networking techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for transit vehicle 110, using one or more power leads. Such power leads may also be used to support one or more communication techniques between elements of system 100.

Figure 2:
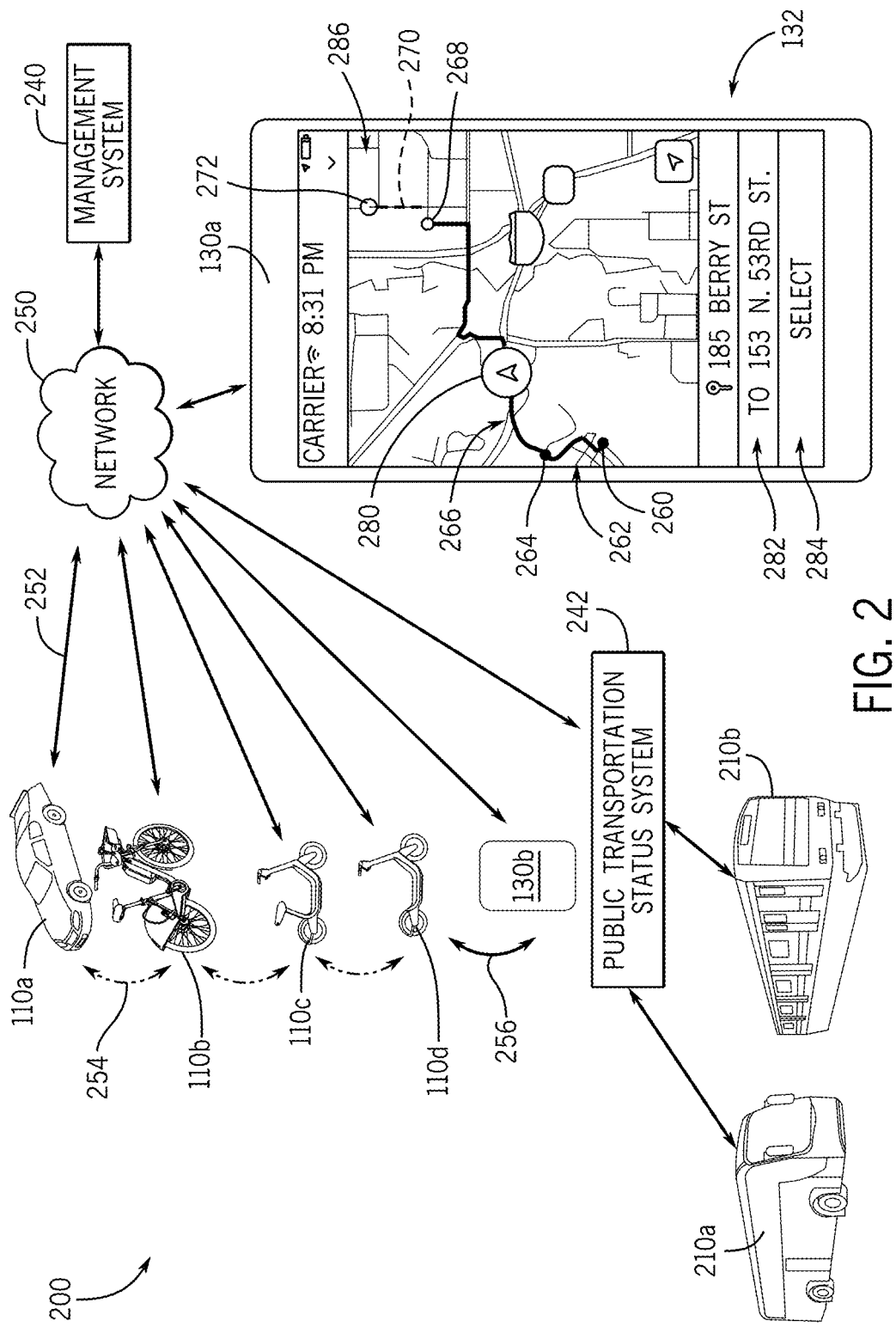
FIG. 2 illustrates a block diagram of a dynamic transportation matching system incorporating a variety of transportation modalities in accordance with an embodiment of the disclosure.

FIG. 2 illustrates a block diagram of a dynamic transportation matching system 200 (or multimodal transportation system) incorporating a variety of transportation modalities in accordance with an embodiment of the disclosure. For example, as shown in FIG. 2, dynamic transportation matching system 200 may include multiple embodiments of system 100. In the embodiment shown in FIG. 2, dynamic transportation matching system 200 includes a management system/server 240 in communication with a number of transit vehicles 110*a-d* and user devices 130*a-b* over a combination of a typical wide area network (WAN) 250, WAN communication links 252 (solid lines), a variety of mesh network communication links 254 (curved dashed lines), and NFC, RFID, and/or other local communication links 256 (curved solid lines). Dynamic transportation matching system 200 also includes a public transportation status system 242 in communication with a variety of public transportation vehicles, including one or more buses 210*a*, trains 210*b*, and/or other public transportation modalities, such as ships, ferries, light rail, subways, streetcars, trolleys, cable cars, monorails, tramways, and aircraft. As shown in FIG. 2, all transit vehicles are able to communicate directly to WAN 250 and, in some embodiments, may be able to communicate across mesh network communication links 254, to convey fleet data and/or fleet status data amongst themselves and/or to and from management system 240.

In FIG. 2, user device 130*a* may receive an input with a request for transportation with one or more transit vehicles 110*a-d* and/or public transportation vehicles 210*a-b*. For example, the transportation request may be a request to use (e.g., hire or rent) one of transit vehicles 110*a-d*. The transportation request may be transmitted to management system 240 over WAN 250, allowing management system 240 to poll status of transit vehicles 110*a-d* and to select one of transit vehicles 110*a-d* to fulfill the transportation request. Upon or after one of the transit vehicles 110*a-d* is selected to fulfill the transportation request, a fulfillment notice from management system 240 and/or from the selected transit vehicle 110*a-d* may be transmitted to the user device 130*a*. In some embodiments, navigation instructions to proceed to or otherwise meet with the selected transit vehicle 110*a-d* may be sent to the user device 130*a*. A similar process may occur using user device 130*b*, but where the transportation request enables a transit vehicle over a local communication link 256, as shown.

Management system 240 may be implemented as a server with controllers, user interfaces, communications modules, and/or other elements similar to those described with respect to system 100 of FIG. 1, but with sufficient processing and storage resources to manage operation of dynamic transportation matching system 200, including monitoring statuses of transit vehicles 110*a-d*, as described herein. In some embodiments, management system 240 may be implemented in a distributed fashion and include multiple separate server embodiments linked communicatively to each other direction and/or through WAN 250. WAN 250 may include one or more of the Internet, a cellular network, and/or other wired or wireless WANs. WAN communication links 252 may be wired or wireless WAN communication links, and mesh network communication links 254 may be wireless communication links between and among transit vehicles 110*a-d*, as described herein.

User device 130*a* in FIG. 2 includes a display of user interface 132 that shows a planned route for a user attempting to travel from an origination point 260 to a destination 272 using different transportation modalities (e.g., a planned multimodal route), as depicted in a route/street map 286 rendered by user interface 132. For example, management system 240 may be configured to monitor statuses of all available transportation modalities (e.g., including transit vehicles and public transportation vehicles) and provide a planned multimodal route from origination point 260 to destination 272. Such a planned multimodal route may include, for example, a walking route 262 from origination point 260 to a bus stop 264, a bus route 266 from bus stop 264 to a bus stop 268 (e.g., using one or more of transit vehicles 210*a* or 210*b*), and a micromobility route 270 (e.g., using one or more of micromobility transit vehicles 110*b*, 110*c*, or 110*d*) from bus stop 268 to destination 272. Also shown rendered by user interface 132 are a present location indicator 280 (indicating a present absolute position of user device 130*a* on street map 286), a navigation destination selector/indicator 282 (e.g., configured to allow a user to input a desired navigation destination), and a notice window 284 (e.g., used to render vehicle status data or other information, including user notices and/or alerts, as described herein). For example, a user may use navigation destination selector/indicator 282 to provide and/or change destination 272, as well as change any portion (e.g., leg, route, etc.) or modality of the multimodal route from origination point 260 to destination 272. In some embodiments, notice window 284 may display instructions for traveling to a next waypoint along the determined multimodal route (e.g., directions to walk to a bus stop, directions to ride a micromobility transit vehicle to a next stop along the route, etc.).

In various embodiments, management system 240 may be configured to provide or suggest an optimal multimodal route to a user (e.g., initially and/or while traversing a particular planned route), and a user may select or make changes to such a route through manipulation of user device 130a, as shown. For example, management system 240 may be configured to suggest a quickest route, a least expensive route, a most convenient route (to minimize modality changes or physical actions a user must take along the route), an inclement weather route (e.g., that keeps the user protected from inclement weather a maximum amount of time during route traversal), or some combination of those that is determined as best suited to the user, such as based on various user preferences. Such preferences may be based on prior use of system 200, prior user trips, a desired arrival time and/or departure time (e.g., based on user input or obtained through a user calendar or other data source), or specifically input or set by a user for the specific route, for example, or in general. In one example, origination point 260 may be extremely congested or otherwise hard to access by a ride-share transit vehicle, which could prevent or significantly increase a wait time for the user and a total trip time to arrive at destination 272. In such circumstances, a planned multimodal route may include directing the user to walk and/or take a scooter/bike to an intermediate and less congested location to meet a reserved ride-share vehicle, which would allow the user to arrive at destination 272 quicker than if the ride-share vehicle was forced to meet the user at origination point 260. It will be appreciated that numerous different transportation-relevant conditions may exist or dynamically appear or disappear along a planned route that may make it beneficial to use different modes of transportation to arrive at destination 272 efficiently, including changes in traffic congestion and/or other transportation-relevant conditions that occur mid-route, such as an accident along the planned route. Under such circumstances, management system 240 may be configured to adjust a modality or portion of the planned route dynamically in order to avoid or otherwise compensate for the changed conditions while the route is being traversed.

Figure 3A:
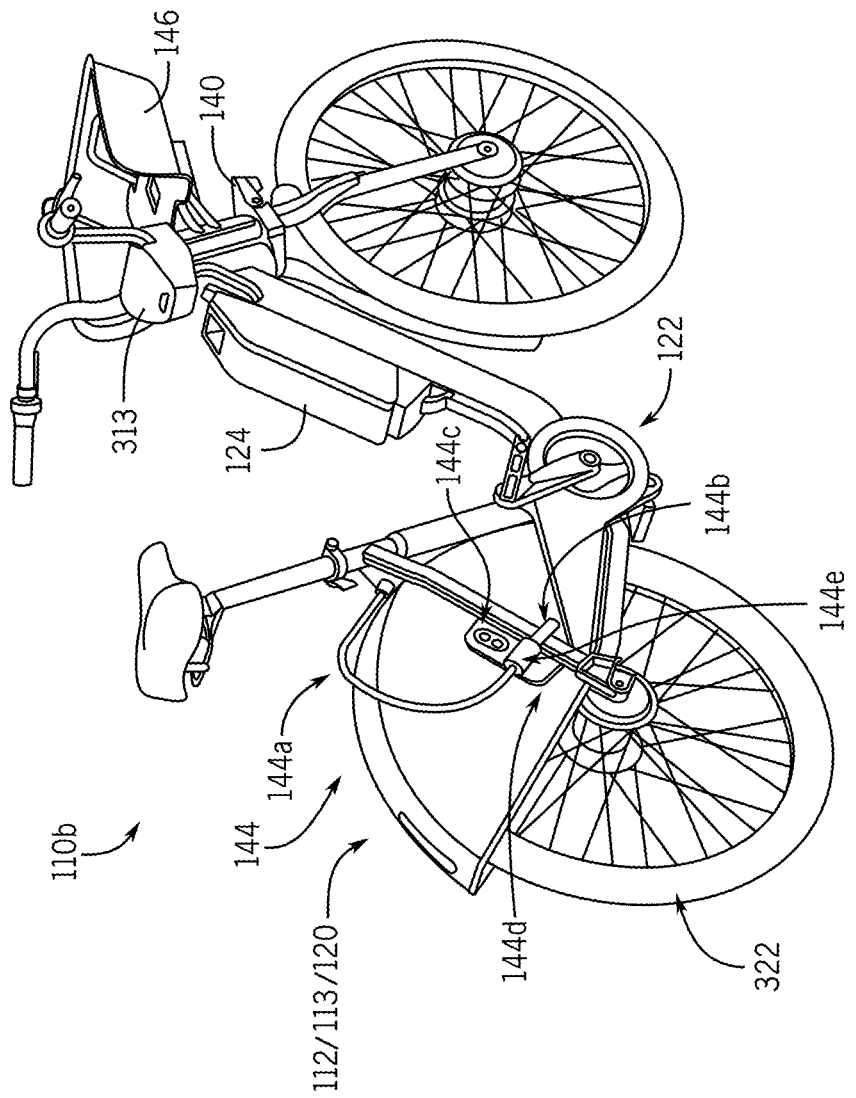
FIGS. 3A, 3B, and 3C illustrate respective diagrams of micromobility transit vehicles for use in a dynamic transportation matching system in accordance with an embodiment of the disclosure.
Figure 3B:
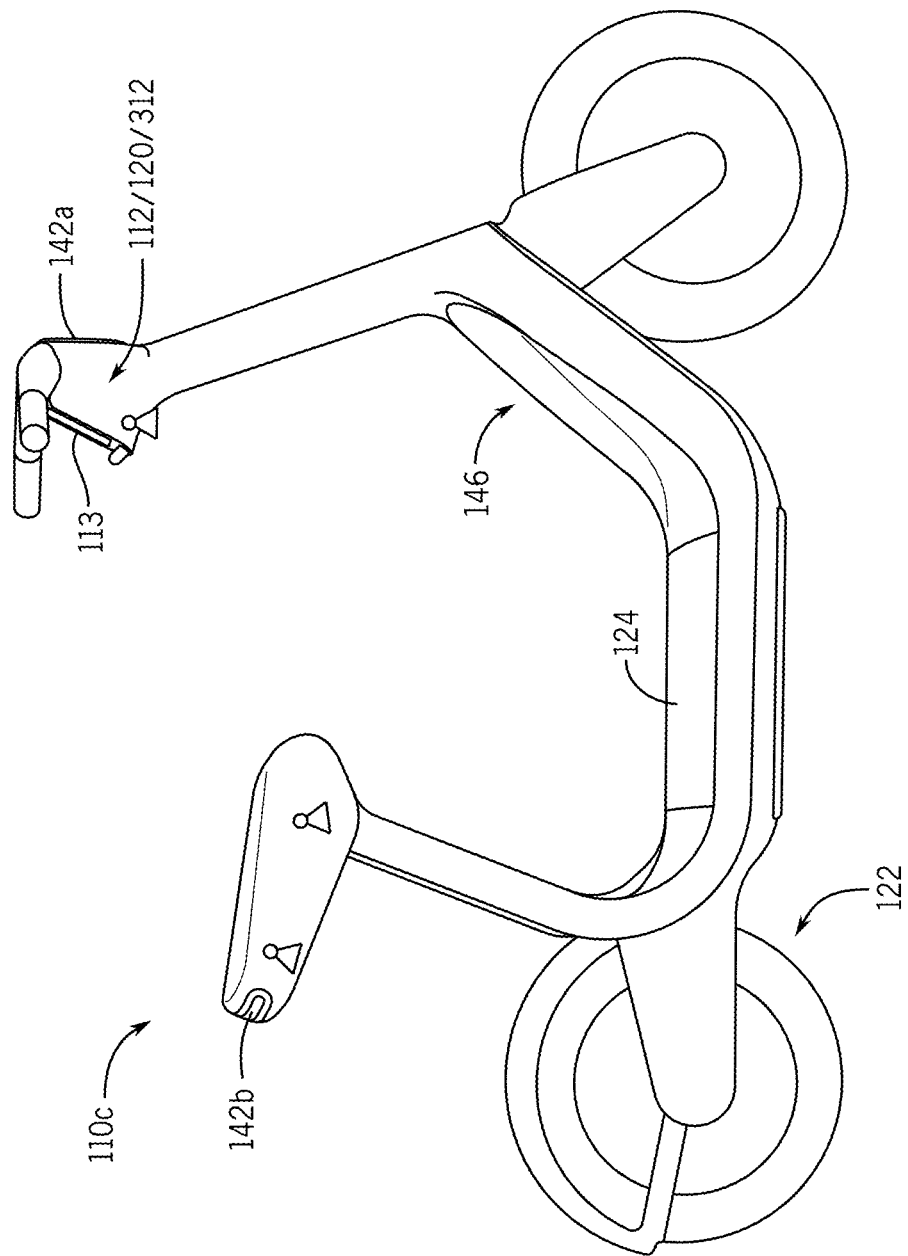
Figure 3C:
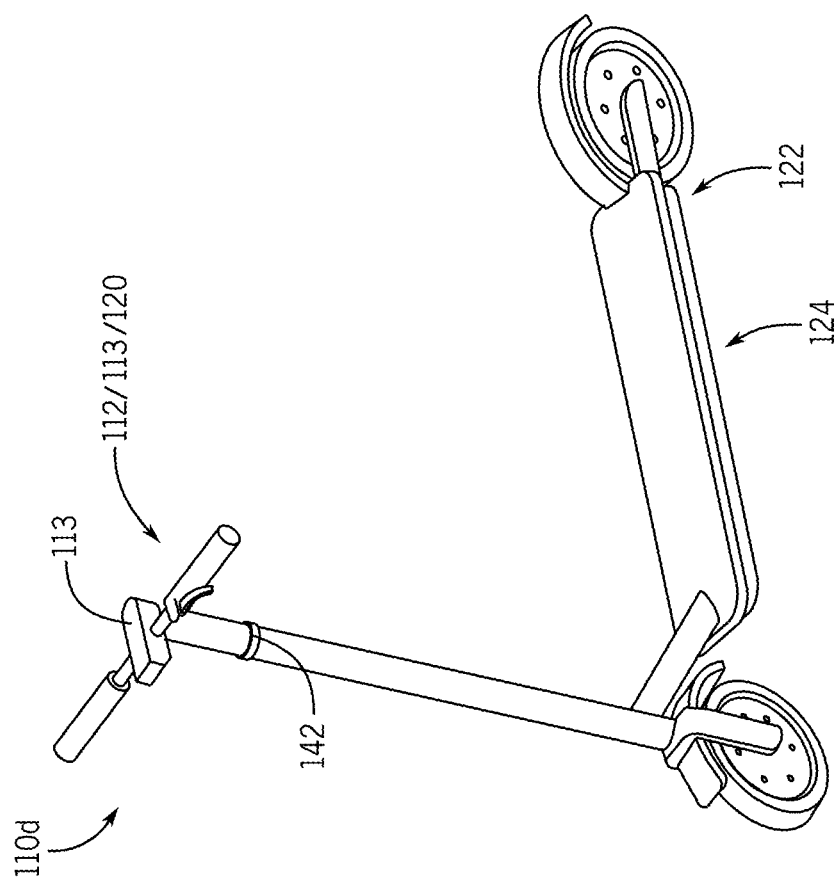

FIGS. 3A, 3B, and 3C illustrate respective diagrams of micromobility transit vehicles 110b, 110c, and 110d, which may be integrated network systems in accordance with an embodiment of the disclosure. For example, transit vehicle 110b of FIG. 3A may correspond to a motorized bicycle integrated with the various elements of system 100 and may be configured to participate in dynamic transportation matching system 200 of FIG. 2. As shown, transit vehicle 110b includes controller/user interface/wireless communications module 112/113/120 (e.g., integrated with a rear fender of transit vehicle 110b), propulsion system 122 configured to provide motive power to at least one of the wheels (e.g., a rear wheel 322) of transit vehicle 110b, battery 124 for powering propulsion system 122 and/or other elements of transit vehicle 110b, docking mechanism 140 (e.g., a spade lock assembly) for docking transit vehicle 110b at a docking station, user storage 146 implemented as a handlebar basket, and vehicle security device (e.g., an embodiment of vehicle security device 144 of FIG. 1), which may incorporate one or more of a locking cable 144a, a pin 144b coupled to a free end of locking cable 144a, a pin latch/insertion point 144c, a frame mount 144d, and a cable/pin holster 144e, as shown (collectively, vehicle security device 144). In some embodiments, controller/user interface/wireless communications module 112/113/120 may alternatively be integrated on and/or within a handlebar enclosure 313, as shown.

In some embodiments, vehicle security device 144 may be implemented as a wheel lock configured to immobilize rear wheel 322 of transit vehicle 110b, such as by engaging pin 144b with spokes of rear wheel 322. In the embodiment shown in FIG. 3A, vehicle security device 144 may be implemented as a cable lock configured to engage with a pin latch on a docking station, for example, or to wrap around and/or through a secure pole, fence, or bicycle rack and engage with pin latch 144c. In various embodiments, vehicle security device 144 may be configured to immobilize transit vehicle 110b by default, thereby requiring a user to transmit a request to management system 240 (e.g., via user device 130) to reserve transit vehicle 110b before attempting to use transit vehicle 110b. The request may identify transit vehicle 110b based on an identifier (e.g., a QR code, a barcode, a serial number, etc.) presented on transit vehicle 110b (e.g., such as by user interface 113 on a rear fender of transit vehicle 110b). Once the request is approved, management system 240 may transmit an unlock signal to transit vehicle 110b (e.g., via network 250). Upon receiving the unlock signal, transit vehicle 110b (e.g., controller 112 of transit vehicle 110b) may release vehicle security device 144 and unlock rear wheel 322 of transit vehicle 110b.

Transit vehicle 110c of FIG. 3B may correspond to a motorized sit-scooter integrated with the various elements of system 100 and may be configured to participate in dynamic transportation matching system 200 of FIG. 2. As shown in FIG. 3B, transit vehicle 110c includes many of the same elements as those discussed with respect to transit vehicle 110b of FIG. 3A. For example, transit vehicle 110c may include user interface 113, propulsion system 122, battery 124, controller/wireless communications module/cockpit enclosure 112/120/312, user storage 146 (e.g., implemented as a storage recess), and operator safety measures 142a and 142b, which may be implemented as various types of headlights, programmable light strips, and/or reflective strips.

Transit vehicle 110d of FIG. 3C may correspond to a motorized stand or kick scooter integrated with the various elements of system 100 and may be configured to participate in dynamic transportation matching system 200 of FIG. 2. As shown in FIG. 3C, transit vehicle 110d includes many of the same elements as those discussed with respect to transit vehicle 110b of FIG. 3A. For example, transit vehicle 110d may include user interface 113, propulsion system 122, battery 124, controller/wireless communications module/ cockpit enclosure 112/120/312, and operator safety measures 140, which may be implemented as various types programmable light strips and/or reflective strips, as shown.

Figure 3D:
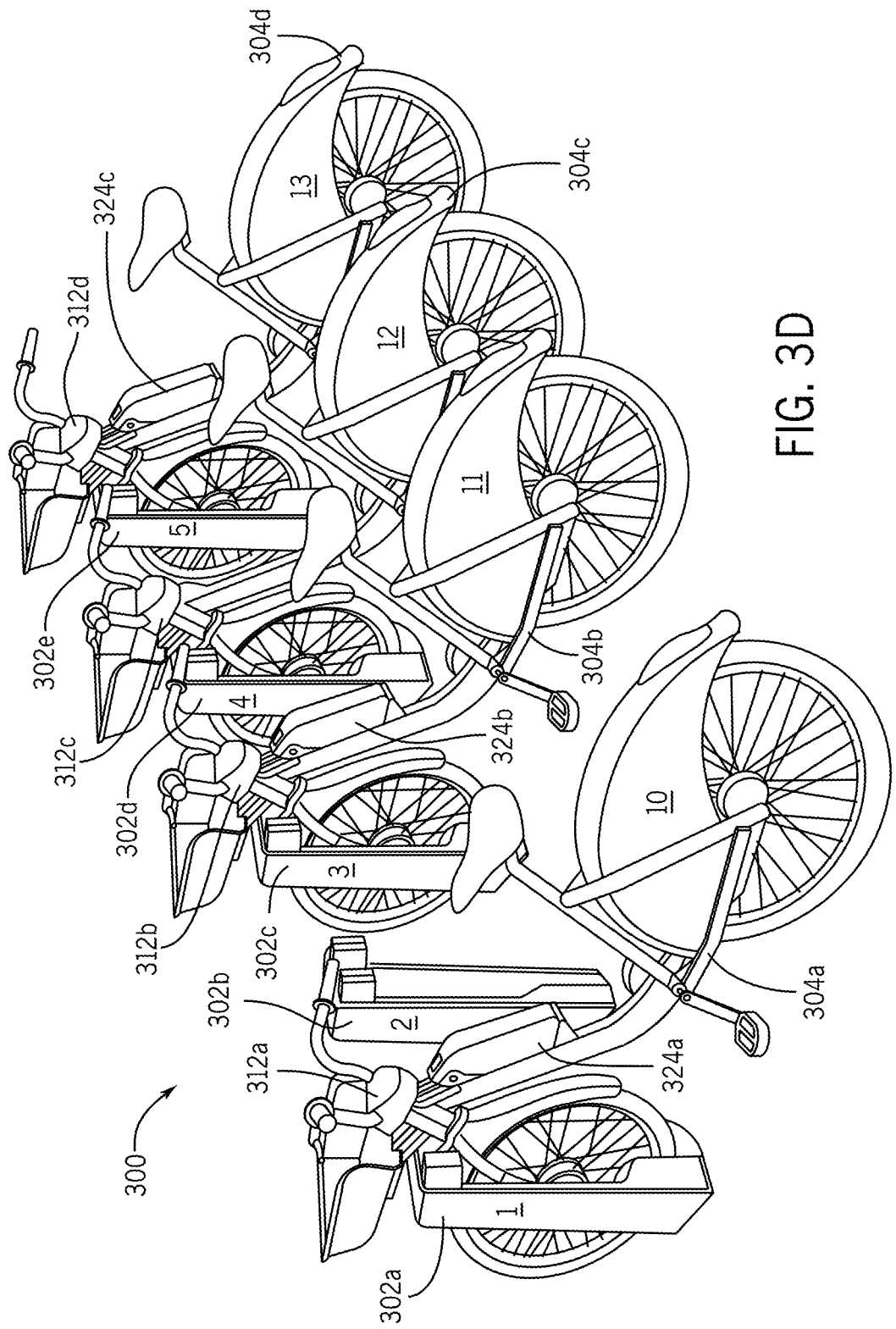
FIG. 3D illustrates a diagram of a docking station for docking one or more micromobility transit vehicles in accordance with an embodiment of the disclosure.

FIG. 3D illustrates a docking station 300 for docking transit vehicles (e.g., transit vehicles 110c, 110e, and 110g, etc.) according to one embodiment. As shown, docking station 300 may include multiple bicycle docks, such as docks 302a-e. In this example, a single transit vehicle (e.g., any one of electric bicycles 304a-d) may dock in each of the docks 302a-e of the docking station 300. Each of the docks 302a-e may include a lock mechanism for receiving and locking docking mechanism 140 of the electric bicycles 304a-d. In some embodiments, once a transit vehicle is docked in a bicycle dock, the dock may be electronically coupled to the transit vehicle (e.g., controllers 312a-d of the transit vehicle) via a link such that the transit vehicle and the dock may communicate with each other via the link.

A user may use a user device (e.g., user device 130) to use a micromobility transit vehicle 110b-d that is docked in one of the bicycle docks 302a-e by transmitting a request to management system 240. Once the request is processed, management system 240 may transmit an unlock signal to a micromobility transit vehicle 110b-d docked in the dock and/or the dock via network 250. The docking station 300 may automatically unlock the lock mechanism to release the micromobility transit vehicle 110b-d based on the unlock signal. In some embodiments, each of the docks 302a-e may also be configured to charge batteries (e.g., batteries 324a-c) of the electric bicycle 304a-d, respectively, when the electric bicycle 304a-d are docked at the docks 302a-e. In some embodiments, docking station 300 may also be configured to transmit information associated with the docking station 300 (e.g., a number of transit vehicles docked at the docking station 300, charge statuses of the docked transit vehicles, etc.) to the management system 240.

Figure 4:
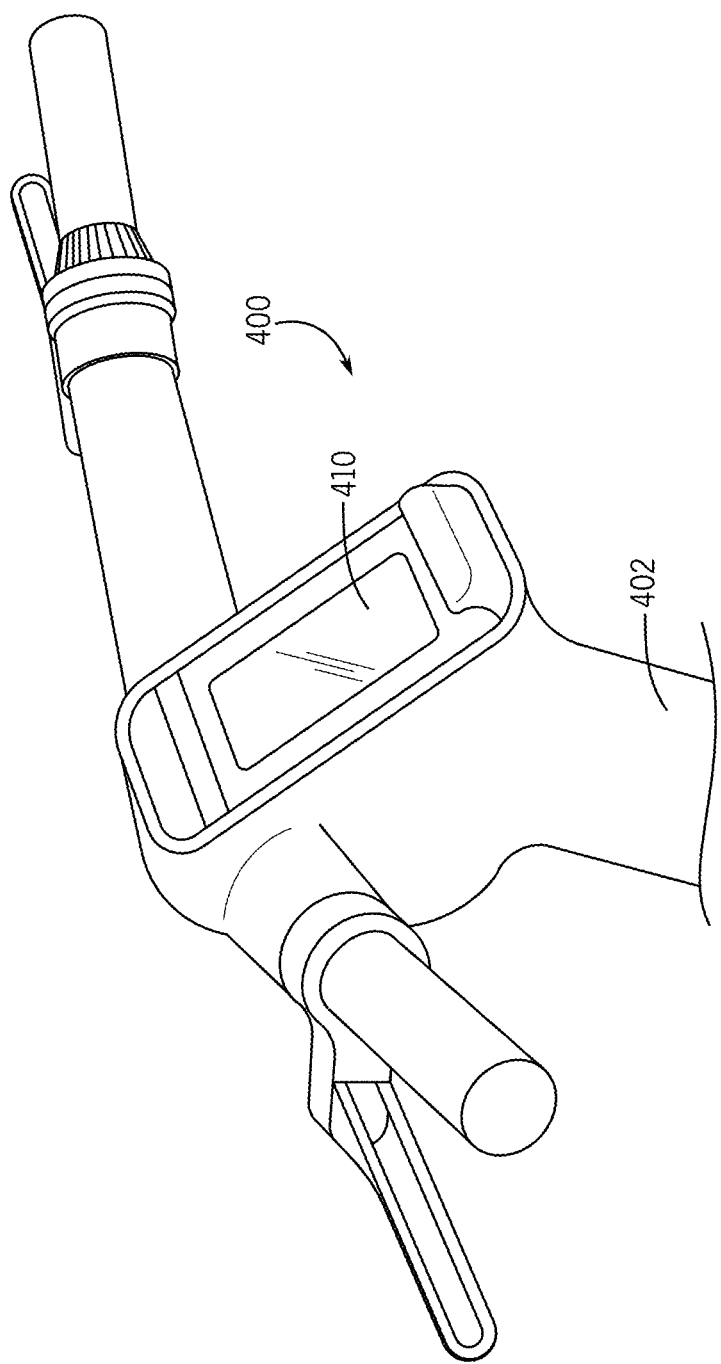
FIG. 4 illustrates a diagram of a user interface associated with a micromobility transit vehicle in accordance with an embodiment of the disclosure.

FIG. 4 illustrates a diagram of a user interface 400 associated with a micromobility transit vehicle 402 in accordance with an embodiment of the disclosure. The micromobility transit vehicle 402 may be similar to any one of transit vehicles 110b, 110c, or 110d, described above. The user interface 400 may be integrated with the micromobility transit vehicle 402, such as integrated with at least a portion of a cockpit of the micromobility transit vehicle 402. In some embodiments, the user interface 400 may form at least a portion of an outer housing of the handlebar of the micromobility transit vehicle 402. The user interface 400 may be visible to the user during operation. For instance, the user interface 400 may generally face rearwardly. The user interface 400 may include a display 410 configured to render information or other data. The display 410 may include many configurations, such as being an electronic ink display, although other configurations are contemplated. In other embodiments, the display 410 may be part of a mobile user computing device, such as a smart phone. As such, content, information, and data discussed herein as being presented on the display 410 can also or alternatively be displayed on the user computing device.

The user interface 400 may be similar to the user interface 113 or 132 described above. For example, route guidance information, usage cost, battery charge status, vehicle range, or other information related to the micromobility transit vehicle 402 may be rendered on the display 410. For instance, the display 410 may render one or more notification related to battery charge such as amount of battery charge that remains (e.g., low, medium, good, or expressed as percentages), whether the battery is malfunctioning or damaged, instructions (including navigational instructions) to take the micromobility transit vehicle 402 to a charging location if the battery requires charging or if the user would like to charge the battery in preparation for a trip, how many useful miles/distance remain based on a current battery charge, what a status of the battery is as it is being charged (e.g., 25%, 50%, 75%, 100%), and so forth. Information related to the operation of the micromobility transit vehicle 402, such as time information, map information, navigation information, instructions for operation, operational warnings or notifications, among others, may be rendered on the display 410. For example, one or more notifications may be rendered on the display 410 instructing or reminding the user to properly lock and/or park the micromobility transit vehicle 402. In some embodiments, the user interface 400 may present information similar to that described in U.S. patent application Ser. No. 16/578,995, entitled "Micromobility Electric Vehicle with Electronic Device Holder and Integrated Display," which is incorporated herein in its entirety for all purposes. Note that there may be situations when no content is displayed, such as when the micromobility transit vehicle 402 is moving, moving above a certain speed, moving in a congested area, and other situations where content may distract the rider.

Figure 5A:
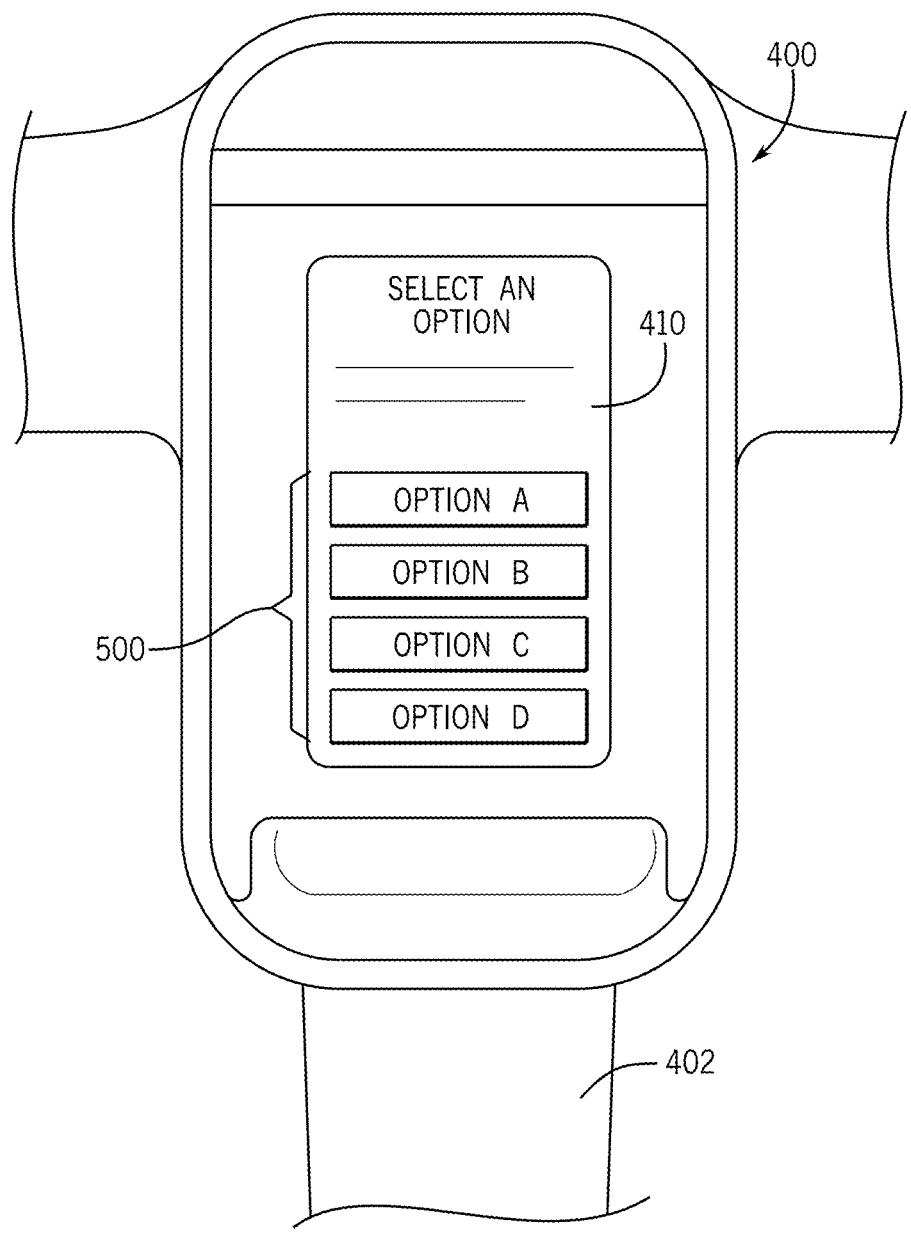
FIGS. 5A, 5B, and 5C illustrate respective diagrams of various examples of information rendered on a display of the user interface of FIG. 4 in accordance with an embodiment of the disclosure.
Figure 5B:
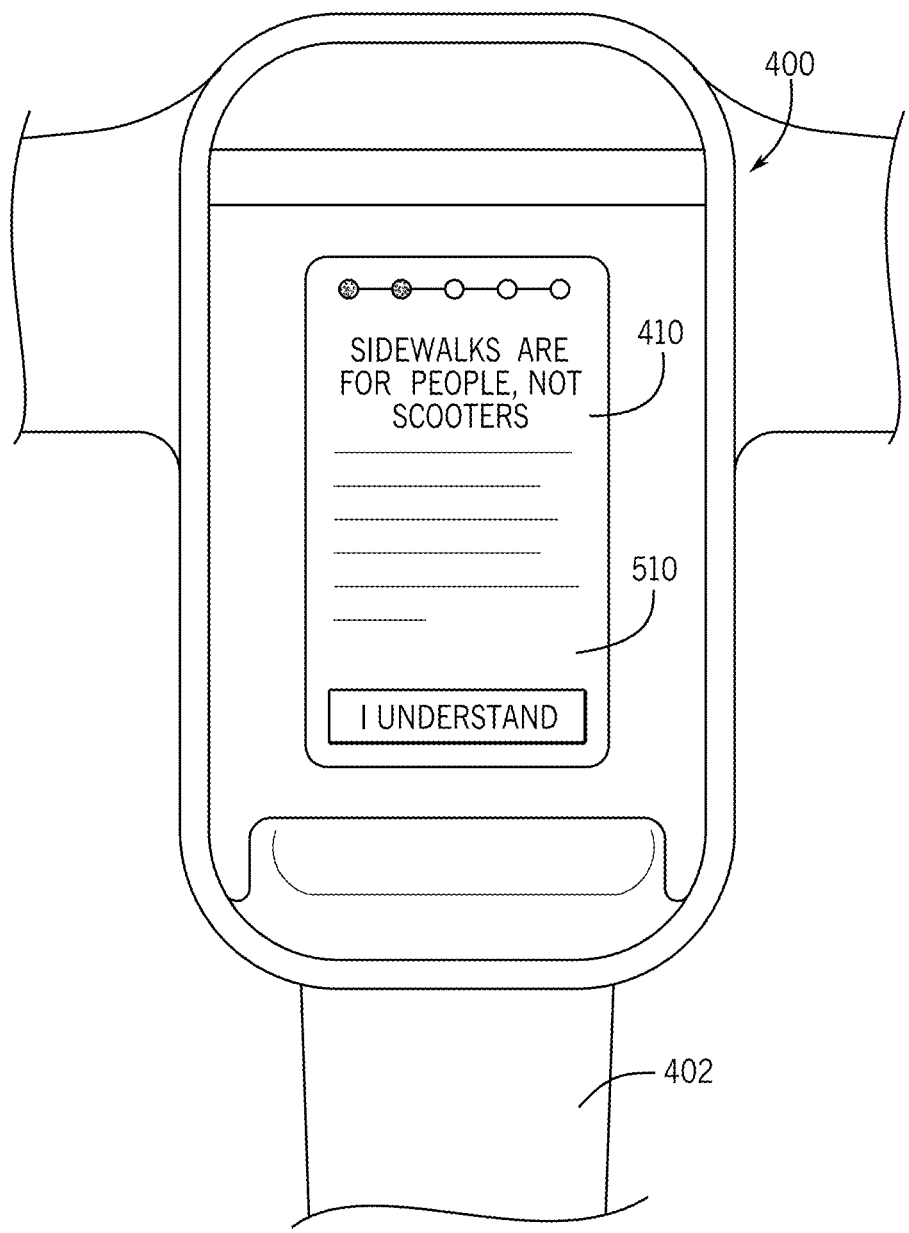
Figure 5C:
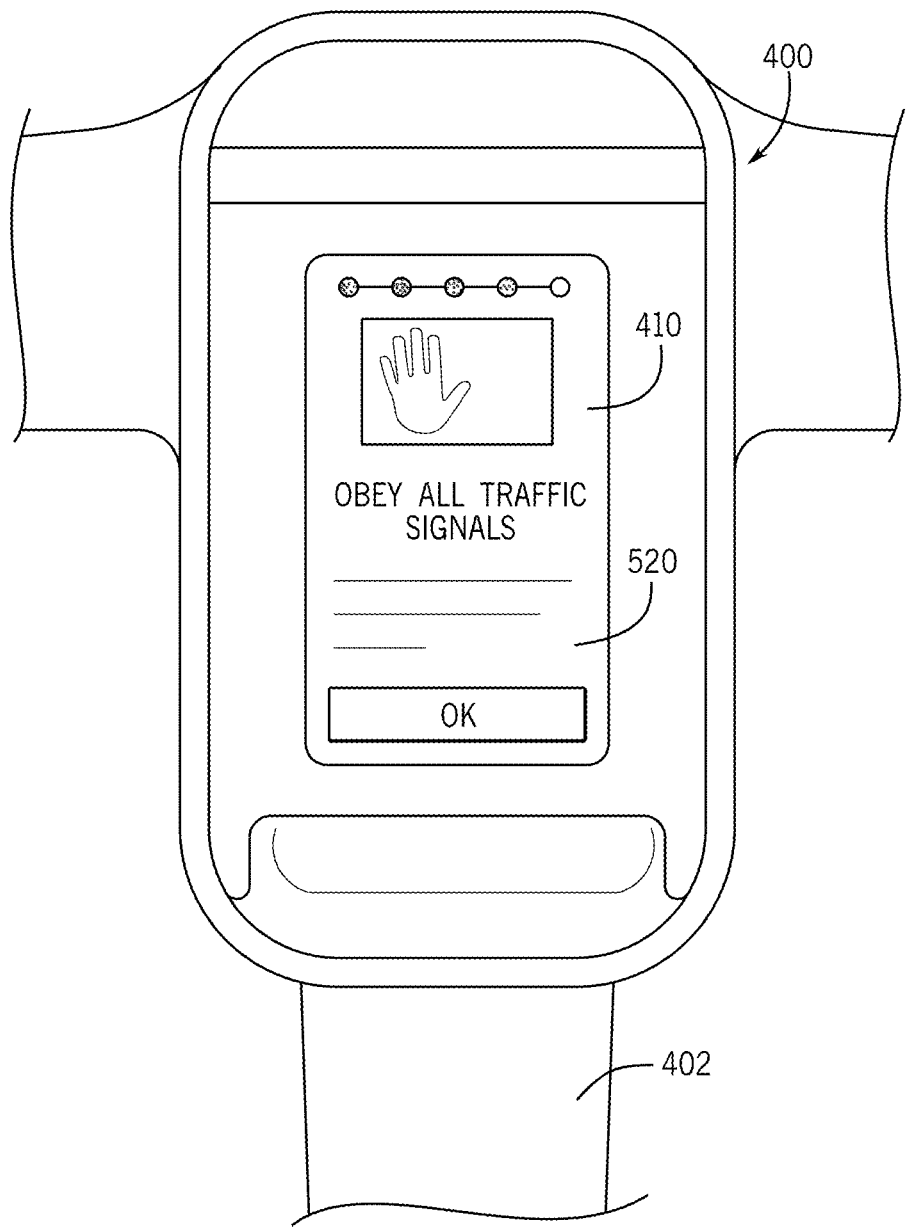

FIGS. 5A, 5B, and 5C illustrate respective diagrams of various examples of information rendered on the display 410 of the user interface 400 in accordance with an embodiment of the disclosure. The display 410 may render various information and different times, such as during operation of the micromobility transit vehicle 402, which includes starting, during, or ending a trip or prior to starting use or after ending a ride of the micromobility transit vehicle 402. For example, as shown in FIG. 5A, the display 410 may render one or more prompts, buttons, or selectable commands (hereinafter "options" 500 for sake of convenience, without intent to limit) for selection. The options 500 may prompt user selection to begin a ride, end a ride, pause a ride, or modify a ride, among others. In some embodiments, the options 500 rendered on the display 410 may allow user selection of one or more navigational commands, such as setting a starting location, setting a destination, starting navigational guidance, ending navigational guidance, modifying an existing navigation route, or the like. In some embodiments, the options 500 rendered on the display 410 may allow a user to unlock the micromobility transit vehicle 402 from a docking station, pair the micromobility transit vehicle 402 to a docking station, request service or maintenance of the micromobility transit vehicle 402, report issues with the micromobility transit vehicle 402, and the like. In some embodiments, the options 500 rendered on the display 410 may allow the user to turn on a headlight assembly, turn off the headlight assembly, or otherwise control operation of one or more systems of the micromobility transit vehicle 402.

Referring to FIG. 5B, the display 410 may render one or more notifications 510 related to operation of the micromobility transit vehicle 402. For instance, the display 410 may render use agreements, local rules and regulations, liability waivers, operation instructions, operation reminders, battery statuses and the like for acknowledgment by the user before, during, or after use of the micromobility transit vehicle 402.

Referring to FIG. 5C, the display 410 may render one or more notifications 520 based on a detected condition of the micromobility transit vehicle 402. For example, the display 410 may render one or more notifications of a detected use violation (e.g., excessive speed detection, traffic signal violation, etc.), parking violation (e.g., on street, within a landscaped area, within a handicapped zone, etc.), lock violation (e.g., free locking, to an improper sign or structure, failure to lock, etc.), or any combination thereof. In other embodiments, the notifications need not be for a violation, but can be for conveying changes during operation of the micromobility transit vehicle 402, providing warnings of upcoming hazards or congestion along the ride or trip, providing reminders for use or operation, providing messages at the start and/or end of a ride, including positive messages if the user has complied with all use regulations or guidelines during the trip or user account updates, such as status, number of rides completed, or total distance traveled on the ride or over multiple rides, and offers or advertisements, such as when the micromobility transit vehicle 402 is detected as being stationary or stopped.

Figure 6:
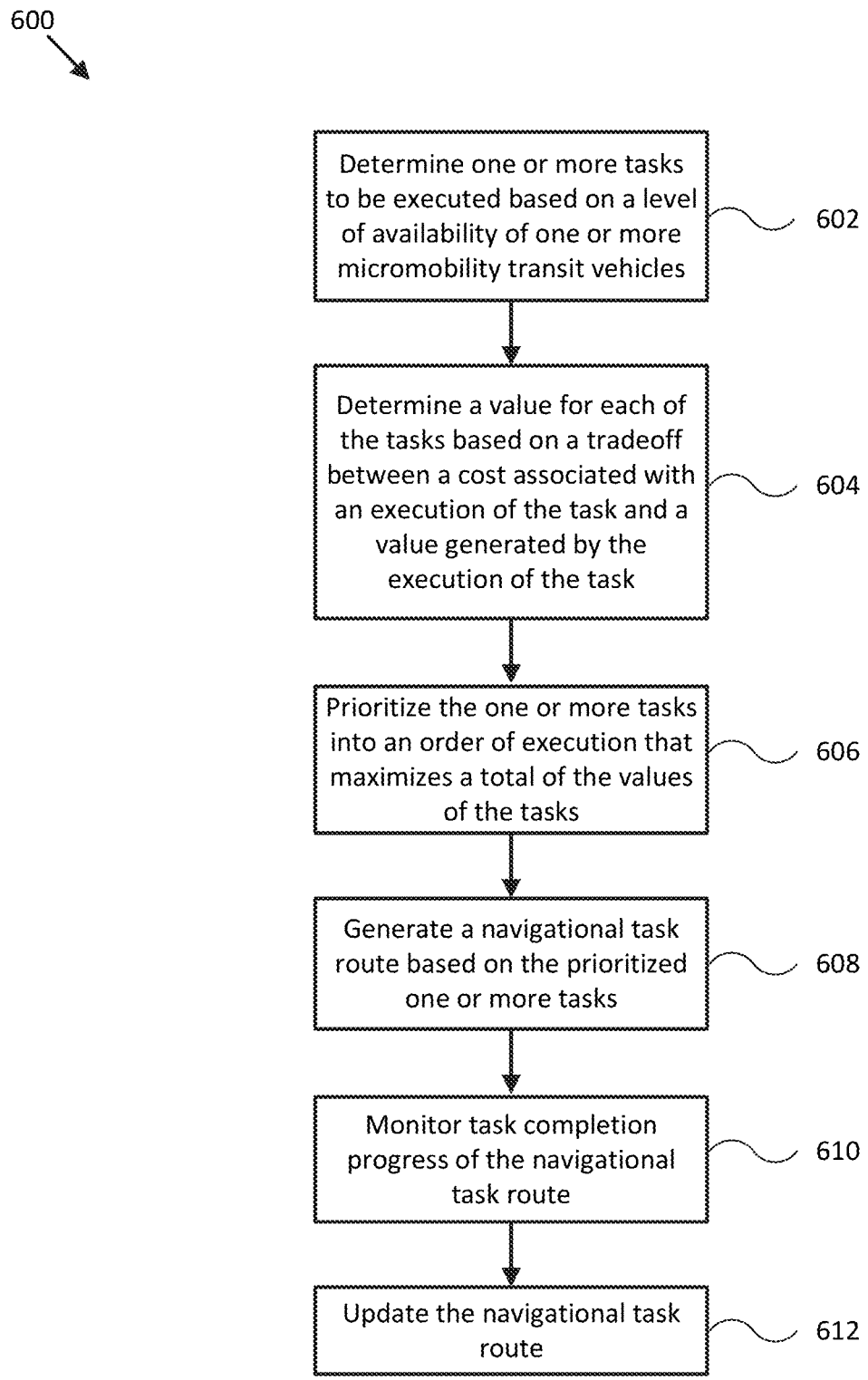
FIG. 6 illustrates a flowchart of a process for creating, prioritizing, and assigning tasks in accordance with one or more embodiments of the present disclosure.

FIG. 6 illustrates a flow diagram of a process 600 for task service and operational management of a fleet of micromobility transit vehicles in accordance with embodiments of the present disclosure. It should be appreciated that any step, sub-step, sub-process, or block of process 600 may be performed in an order or arrangement different from the embodiments illustrated by FIG. 6. For example, one or more blocks may be omitted from or added to the process 600. In describing process 600 of FIG. 6, reference will be made to other Figures of the present disclosure.

At block 602, a system (e.g., dynamic management system 240 of FIG. 2) may determine one or more tasks to be executed based at least in part on a level of availability of one or more micromobility transit vehicles. For example, the one or more micromobility transit vehicles may be or may be part of a fleet of micromobility transit vehicles owned, managed, and/or serviced primarily by a fleet manager/servicer and made available for use by the public as one or more types of transportation modalities offered by a dynamic transportation matching system (e.g., dynamic transportation matching system 200 of FIG. 2).

According to various embodiments, the one or more tasks determined by the system may be types of service tasks that, when executed, may help to increase the number of micromobility transit vehicles available for use by the public (e.g., increase a level of availability of micromobility transit vehicles within a particular geographic region). In some embodiments, the level of availability (e.g., rideability) of micromobility transit vehicles may include how accessible a micromobility transit vehicle currently is for users as part of a dynamic transportation matching system that matches micromobility transit vehicles to users. For example, a micromobility transit vehicle that is within a certain proximity (e.g., 400 meters) from a user (or where there has historically been user ride request demand) and is available for use (e.g., not blocked or removed from an availability pool in a dynamic transportation matching system due to low battery or requiring maintenance service) may be considered more accessible. Conversely, where there are no or fewer micromobility transit vehicles (e.g., some micromobility transit vehicles are blocked from being reserved/used due to low battery or requiring maintenance service) within a certain proximity to the user or locations having historic or predicted user ride request demand, the micromobility transit vehicles may be considered less accessible and the level of availability may be lower than desired or at or near a minimum. The tasks determined by the system may include maintenance service tasks, repair tasks, move tasks, drop-off tasks, pick-up tasks (e.g., picked up to be returned to a warehouse depot), battery swap tasks, and various other tasks related to the servicing and operational management of a micromobility transit vehicle that help to increase the level of availability.

In an example use case, the system may determine that the one or more tasks to be executed includes a drop-off type of task. In this example, the system may evaluate a geographical location (e.g., docking station, station, designated location) based on historic ride data corresponding to that geographical location and a current number of micromobility transit vehicles available for use at the geographical location (e.g., current number of micromobility transit vehicle may be obtained in real-time by the system through GPS location tracking of the micromobility transit vehicles). In some embodiments, the historic ride data may include user ride data such as where rides start and end, where users make a request for a micromobility transit vehicle, where users opens a mobile application prior to making a request for a micromobility transit vehicle, and so forth. The historic ride data may be recorded for each ride by a user of the dynamic transportation matching system and may be accessible by the system to learn user ride request demand patterns (e.g., where and when users have made or considered making ride requests to the dynamic transportation matching system).

If the system determines that there has historically been a high demand for micromobility transit vehicles at a geographical location but the number of current micromobility transit vehicles currently located at the geographical location and available for use is low or insufficient to meet the historic user ride request demand, the system may determine that a drop-off task or move-task should be executed for the geographical location to increase the level of availability at the geographical location. A drop-off task may include placing a micromobility transit vehicle at a location agnostic from an origination source such as another public location or a warehouse depot where micromobility transit vehicles are stored. A move task may be part of a rebalancing or redistribution effort where a micromobility transit vehicle is moved from one location for the purpose of placing it at a separate location. After the system has determined the particular task that should be executed, the system may create the drop-off task or move task and make it available (e.g., opened, queued, etc.) to be considered by the system as further discussed at block 604 and the remaining blocks of the process 600.

In another example use case, the system may determine that the one or more tasks to be executed includes a drop-off task or move task based on the level of availability of micromobility transit vehicles at a geographical location that has a corresponding threshold requirement. For example, the geographical location may correspond to a station or a designated location where micromobility transit vehicles are made available for use. In some cases, a station may have dedicated infrastructure suitable to dock micromobility transit vehicles (e.g., docking station 300 of FIG. 3D). The threshold corresponding to a station may be predefined and set forth the number of micromobility transit vehicles that are required to be available for use at the station over a certain time period (e.g., a level of availability). As an illustration, the station may have a threshold that requires at least three micromobility transit vehicle be made available at the station at some point in time during every two-hour time window. Thus, the system may monitor the number of micromobility transit vehicles available for use at the station (e.g., via GPS tracking of the micromobility transit vehicles and whether they are reserved or available to be reserved for use) and if the number of available micromobility transit vehicles is unlikely to meet the threshold requirement without system intervention based on statistical probability calculated from historic ride data, the system may identify that a drop-off task or move task should be performed to have micromobility transit vehicle(s) placed at the station so that the threshold can be satisfied.

In some embodiments, the system may monitor arrival and departure rates of micromobility transit vehicles at certain stations or monitor arrival and departure rates of micromobility transit vehicles in relation to a cluster of stations (e.g., a plurality stations) in an aggregated fashion within a geographical area to determine the one or more tasks at block 602. For example, the system may calculate an arrival rate of micromobility transit vehicles into a first station and a departure rate of micromobility transit vehicles from the first station by, for example, tracking the micromobility transit vehicles' GPS locations as they enter and leave a geofence representing the geographical area or identifying, by communicating with the station, when micromobility transit vehicles have been unlocked at the station to be used and locked at the station when returned.

Based on the calculated arrival and departure rates of micromobility transit vehicles at the first station, the system may determine that a drop-off task or move task should be executed at the first station to have micromobility transit vehicles be more available for the dynamic transportation matching system to match users to micromobility transit vehicles near the station. For example, the system may determine that the arrival and departure rates may indicate that the station has a deficit of micromobility transit vehicles based on historic user ride request demand at or near (e.g., within a proximity to) the first station. In this regard, the system may predict the demand at or near the first station for certain periods of the day, under current traffic conditions, and/or under certain weather conditions based on the historic user ride request demand data, and the system may determine that, based on current arrival and departure rates at the first station, that a drop-off task or move task should be executed for the first station to meet demand and/or optimize availability within a geographical area through redistribution/rebalancing micromobility transit vehicles amongst several locations.

In cases such as where rebalancing/redistribution may provide for more availability of micromobility transit vehicles for use in dynamic transportation matching, the system may monitor a second station and calculate an arrival and departure rate for the second station. Based on the calculated arrival and departure rates of the micromobility transit vehicles at the first and second stations, the system may determine that a move task should be performed at one station and a drop-off task should be performed at the other station to provide for more availability of micromobility transit vehicles based on predicted demand for the stations. The first and second stations are provided for illustrative purposes and it will be appreciated that additional stations may be monitored as described above to identify move and drop-off tasks to redistribute/rebalance the micromobility transit vehicles amongst the stations. In some instances, the system may monitor the arrival and departure rates at a cluster of stations in the aggregate to determine that drop off or move tasks should be performed within the geographical area encompassing the cluster of stations.

In further embodiments, the system may evaluate the arrival and departure rates along with the average level of availability of micromobility transit vehicles at the first station to determine if the level of availability at the first station meets a predefined threshold level of availability such as that corresponding to compliance with a service agreement. For example, the fleet manager/servicer may have a service agreement to make a number micromobility transit vehicles available for use at certain locations within a state, county, city, district, neighborhood, etc. during certain periods of the day. The service agreement may set forth the distribution requirements for the micromobility transit vehicles throughout a geographical area. For example, the service agreement may require that each station within the geographical area cannot be without a certain number of micromobility transit vehicles available for use at a station for longer than a certain period (e.g., a two-hour period or between certain hours on certain days). To illustrate, a station that does not have a micromobility transit vehicle available for use between 4:00 PM and 7:00 PM may cause a violation of the predefined threshold corresponding to the service agreement. Thus, the system may evaluate arrival and departure rates and average level availability of micromobility transit vehicles at a station to predict whether a violation is likely to occur. If the system predicts that the violation is likely to occur, the system may recommend that a drop-off task be performed at the station. In some instances, the system may predict that the violation is likely to occur based on evaluation of historic ride data at the station in conjunction with the present arrival and departure rates.

In another example use case, the system may determine, at block 602, that the one or more tasks to be executed includes a move type of task. For example, the system may evaluate a geographical location based on historic ride data corresponding to that geographical location and a current number of micromobility transit vehicles available for use at the geographical location. In some embodiments, the historic ride data may include the number of rides that have originated or ended at the geographical location and conditions of the ride such as the traffic conditions, weather conditions, and how many micromobility transit vehicles were available at the geographical location when ride requests were made which may have influenced a user's decision to request a ride, etc. If the system determines that there has historically been a low user demand for micromobility transit vehicles at the geographical location and the number of micromobility transit vehicles currently located at the geographical location and available for use exceeds an amount sufficient to meet the historic demand, the system may determine that a move task should be executed at the geographical location to redistribute the micromobility transit vehicle(s) to different locations such as under-supplied locations to provide for greater availability of micromobility transit vehicles for dynamic transportation matching.

In another example use case, the system may determine that the one or more tasks to be executed includes a maintenance service or repair type of task or a pick-up type of task. In some embodiments, maintenance service and/or repair tasks may be performed in the field while pick-up tasks may be for picking-up a micromobility transit vehicle to be returned to a warehouse depot for more extensive maintenance service, repair, or storage, for example. For example, the system may receive status updates (e.g., periodically and/or upon request by the system) from a micromobility transit vehicle, where the status updates may contain diagnostic information that indicates to the system that the micromobility transit vehicle requires maintenance service. For example, the status updates received from the micromobility transit vehicle may include one or more requests for maintenance service such as services related to tire pressure and tire wear, lighting components, brake and throttle operation, lubrication, tightening fasteners, battery operation, sensor operation, steering operation, and various other electrical and mechanical components of the micromobility transit vehicle for proper operation of the micromobility transit vehicle. In some cases, the micromobility transit vehicle may have various sensors installed thereon and which are capable of assisting in the detection that the maintenance service should be performed. For example, based on the detections by the sensors, a controller coupled to the sensors may be able to send maintenance service requests to the system via a wireless communication module as discussed in reference to FIG. 1.

In some cases, a user may report a status of the micromobility transit vehicle to the system to request that maintenance service be performed on the micromobility transit vehicle. For example, a user may notice before riding a micromobility transit vehicle that the micromobility transit vehicle has low tire pressure. The user may report the low tire pressure to the system (e.g., by using user device 130 of FIG. 1 to communicate to the dynamic transportation matching system 200 of FIG. 2). In response to the user-reported status, the system may cause the user to instead be matched to a different micromobility transit vehicle. Based on the status updates received from the micromobility transit vehicle and/or from the user, the system may determine that a service maintenance task should be executed to render the micromobility transit vehicle more readily available for use in dynamic transportation matching. In some instances, where a micromobility transit vehicle requires maintenance service, the system may block the micromobility transit vehicle from use by removing the micromobility from the pool of available micromobility transit vehicles in dynamic transportation matching until the maintenance service can be performed. Thus, a user may not be matched with the micromobility transit vehicle until a maintenance service task that has been generated for the micromobility transit vehicle is executed for the micromobility transit vehicle or the maintenance service task is overridden by the system after appropriate checking and review.

In further embodiments, the system may determine that the one or more tasks to be executed includes a battery service task. For example, as part of the status updates received from a micromobility transit vehicle, the system may determine that the micromobility transit vehicle requires a battery swap (e.g., replacement with a new battery, replacement with a charged battery, replacement with a battery from another micromobility transit vehicle or a battery charging station) when a battery charge level for a battery installed in the micromobility transit vehicle is below a threshold battery charge level. In some cases, the threshold battery charge level under which the battery should be serviced may vary depending on certain conditions. For example, at a time of day where the micromobility transit vehicle is predicted to have a higher amount of demand and use (e.g. rush hour), the battery threshold level may be higher so that the micromobility transit vehicle has a sufficient battery charge remaining to support the higher amount of use. Conversely, at a time of day where the micromobility transit vehicle is predicted to have a low amount of demand and use (e.g., such as during a very early morning), the battery threshold level that indicates the battery should be swapped may be lower as the battery charge level is more likely to be sufficient for low-demand and low-use periods.

At block 604, the system may determine a value for each of the tasks determined at block 602 based on a tradeoff between a cost (e.g., cost value) associated with the execution of the task and a value generated by the execution of the task. For example, each of the tasks determined at block 602 may have an associated cost to perform the task such as an amount of time that will be required to execute the task, an amount of time that will be required to travel to the task location and park an operation technician vehicle, a distance that will be required to travel to the task location from an operation technician's location (e.g., operation technician device's GPS location), a type of operation technician vehicle required to execute the task (e.g., larger van type technician vehicle may be required to move micromobility transit vehicles, certain technician vehicles equipped with mobile battery charging stations may be required to perform battery swap tasks, technician vehicles outfitted with special maintenance tools may be required for certain maintenance service tasks such as inflating tires). In some embodiments, the cost items may be quantified and provided to a function that assigns relative weights to the different cost items and outputs an overall cost. In various embodiments, the cost associated with the execution of the task may represent a cost for a dynamic transportation system that manages several transportation modalities.

The value from the execution of a task may be based on an increase in the level of availability of the one or more micromobility transit vehicles for the dynamic transportation matching system to select for matching with a user for a ride in response to a request to ride a micromobility transit vehicle and, consequently, an increase in the number of rides facilitated by the dynamic transportation matching system. For example, when a drop-off task is executed, the dropped-off micromobility transit vehicles may increase the level of availability of the micromobility transit vehicles for use at the location where they are dropped-off. When a move task is executed, the moved micromobility transit vehicle may be relocated to a location where it may have greater likelihood of use, which may further increase the level of availability of the micromobility transit vehicles for matching with users. When a maintenance service task or battery service task is executed, the micromobility transit vehicle that receives the maintenance service and/or the battery service may be more available as the micromobility transit vehicle is in a better condition to continue providing a mode of transportation for users as part of a dynamic transportation matching system. In some embodiments, the value from execution of the task may be further based on a predicted demand as discussed with reference to block 602 and current traffic and weather conditions. For example, where the predicted demand for a particular location is expected to be high in the future, there may be a great value in moving micromobility transit vehicles to where the demand is predicted to be high. In some embodiments, the value from the execution of the task may represent a number and/or length of rides that are likely to occur after the execution of the task. In some cases, the value from the execution of the task may further represent a monetary amount associated with the number and/or length of rides likely to occur after the execution of the task.

In various embodiments, the system may determine the value of a task as a net numerical representation (e.g., score, dollar amount) of the tradeoff (e.g., balance) between the cost associated with the execution of the task and the value generated from executing the task. Thus, in some cases, even if the value generated by execution of a task may be lower than other candidate tasks, the system may value the task overall greater than the other candidate tasks as a cost associated with the execution of the task is even lower than the value generated by the execution of the task by a wide margin. As discussed herein, the value of a task may be the basis for which the system determines the task should be included in a navigational task route.

According to some embodiments, the system may select tasks from the determined tasks at block 602 to be included in a navigational task route based on the value determined at block 604 (e.g., the return on investment (ROI) tradeoff of the value generated by execution of the task minus the cost of execution of the task (e.g., driving, parking, task completion time, etc.)). In some embodiments, the system may compare the values of the tasks to a minimum threshold value. If the value of a task exceeds the minimum threshold value, the system may create a task and make it available to be considered at block 606. In some cases, the minimum threshold value may be set so that each of the tasks determined at block 602 is created and made available to be considered at block 606. In other embodiments, the system may select a subset of tasks that, when prioritized in a particular order, provide the greatest value from their execution, for example, as discussed below with reference to block 606. Non-selected tasks may be placed in a queue for future consideration by the system as changes occur in the field with regard to the fleet of micromobility transit vehicles, for example, as later discussed at block 608.

Figure 7A:
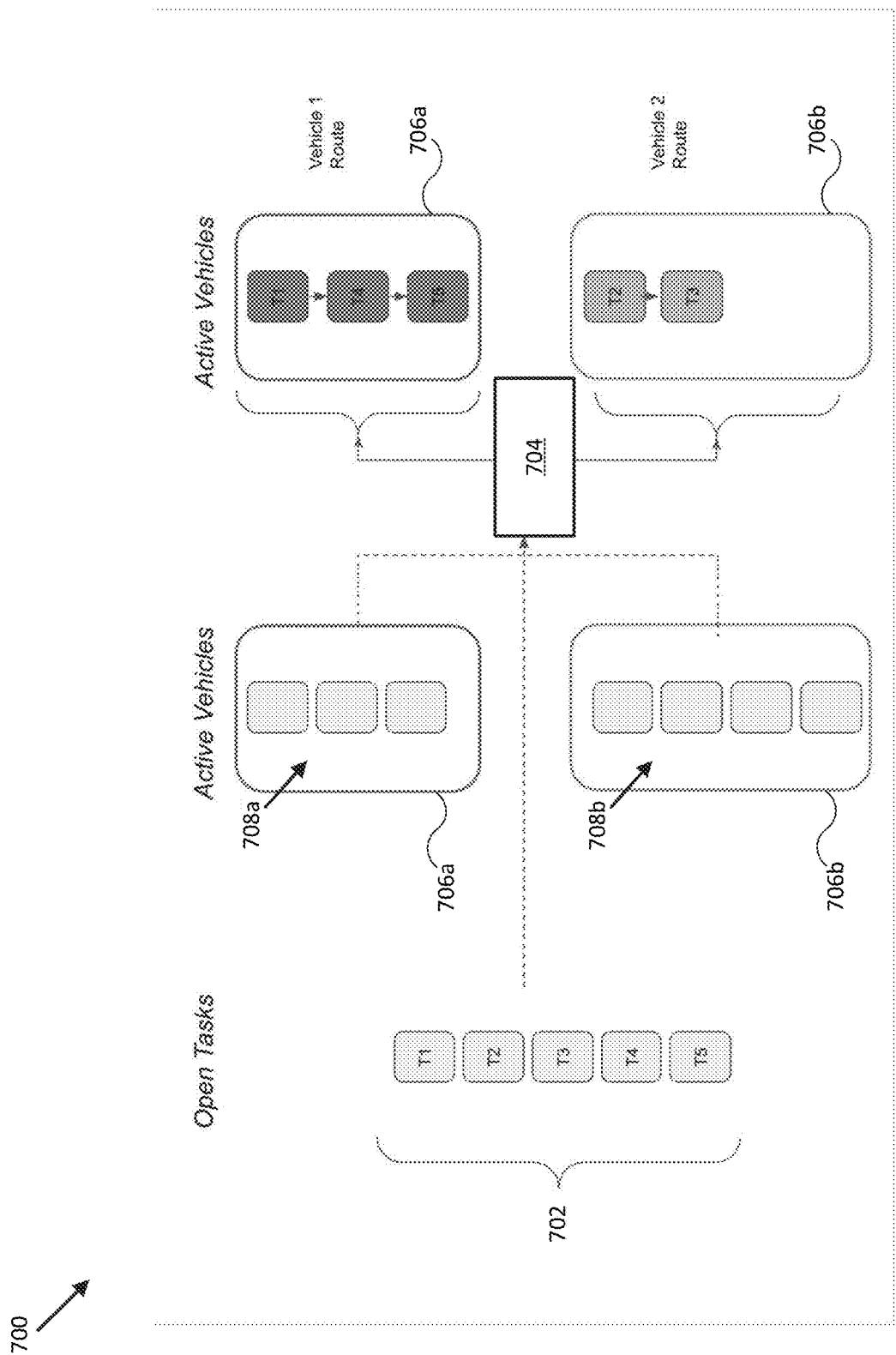
FIGS. 7A-7C illustrate examples of prioritizing tasks in accordance with one or more embodiments of the present disclosure.

At block 606, the system may prioritize the one or more tasks into an order of execution that maximizes a total of the values of the tasks (or subset of tasks from block 604). Referring to example 700 of FIG. 7A, in some embodiments, in addition to the values of the tasks determined at block 604, the prioritization of the tasks may be further based on acquired constraints such as a number of technician vehicles 706a and 706b (and corresponding technicians) available in a geographical area encompassing the locations of the one or more tasks 702 (T1, T2, T3, T4, and T5), a micromobility transit vehicle carrying capacity and type of each of the technician vehicles 706a and 706b, the geolocations of the tasks 702 relative to each other, the current tasks that may be in progress by the technicians (e.g., technician bandwidth to handle additional tasks), technician task execution performance profile (e.g., how quickly a technician has historically executed tasks may be recorded to create a technician performance profile), technician shift durations, whether the order of the tasks should end at a warehouse depot (e.g. the end of a technician shift should finish back at the warehouse depot or micromobility transit vehicles are to be returned to the warehouse depot for more extensive repair or maintenance), and real-time and historic traffic data (e.g., traffic data acquired by the system through API services such as Google Maps APIs).

As shown in example 700, in prioritizing the tasks 702, the system 704 may have a constraint such as the number of technician vehicles available in a geographical area may be limited to technician vehicles 706a and 706b and that technician vehicle 706a has a carrying capacity 708a of three and the technician vehicle 706b has a carrying capacity 708b of four. For example, in this case, there may be two technicians available during an operations shift within the geographical area (e.g., geofence) and their respective technician vehicles 706a and 706b may have different carrying capacities due to their type of vehicle (e.g., van, truck, etc.) and/or micromobility transit vehicles or other cargo may be occupying space within the vehicle. In example 700, each of the tasks 702 that are to be prioritized may require carrying space onboard a technician vehicle to be executed (e.g., drop-off and pick-up tasks require carrying space onboard a technician vehicle) and the total available carrying capacity between the available technician vehicles 706a and 706b is seven, which may be sufficient to execute each of the tasks 702. In some cases, the system 704 may send a communication to the technician vehicles 706a and 706b requesting information regarding their current carrying capacities. For example, the technician vehicles 706a and 706b may be equipped with sensors (e.g., weight sensors) capable of determining what capacity is available to carry additional micromobility transit vehicles. Thus, based on the sensor readings, the technician vehicles 706a and 706b, through a communication module similar to wireless communications module 120 of FIG. 1, may be able to respond to the system with their current carrying capacities 708a and 708b. In some embodiments, the system may send a request to a technician device associated with the technician vehicles 706a or 706b so that the technician may respond with a current carrying capacity upon a visual inspection.

As shown in example 700, the system 704 may prioritize the tasks 702 based on the constraints to have tasks T1, T4, and T5 executed by a technician corresponding to the technician vehicle 706a and tasks T2 and T3 executed by a technician corresponding to the technician vehicle 706b.

Figure 7B:
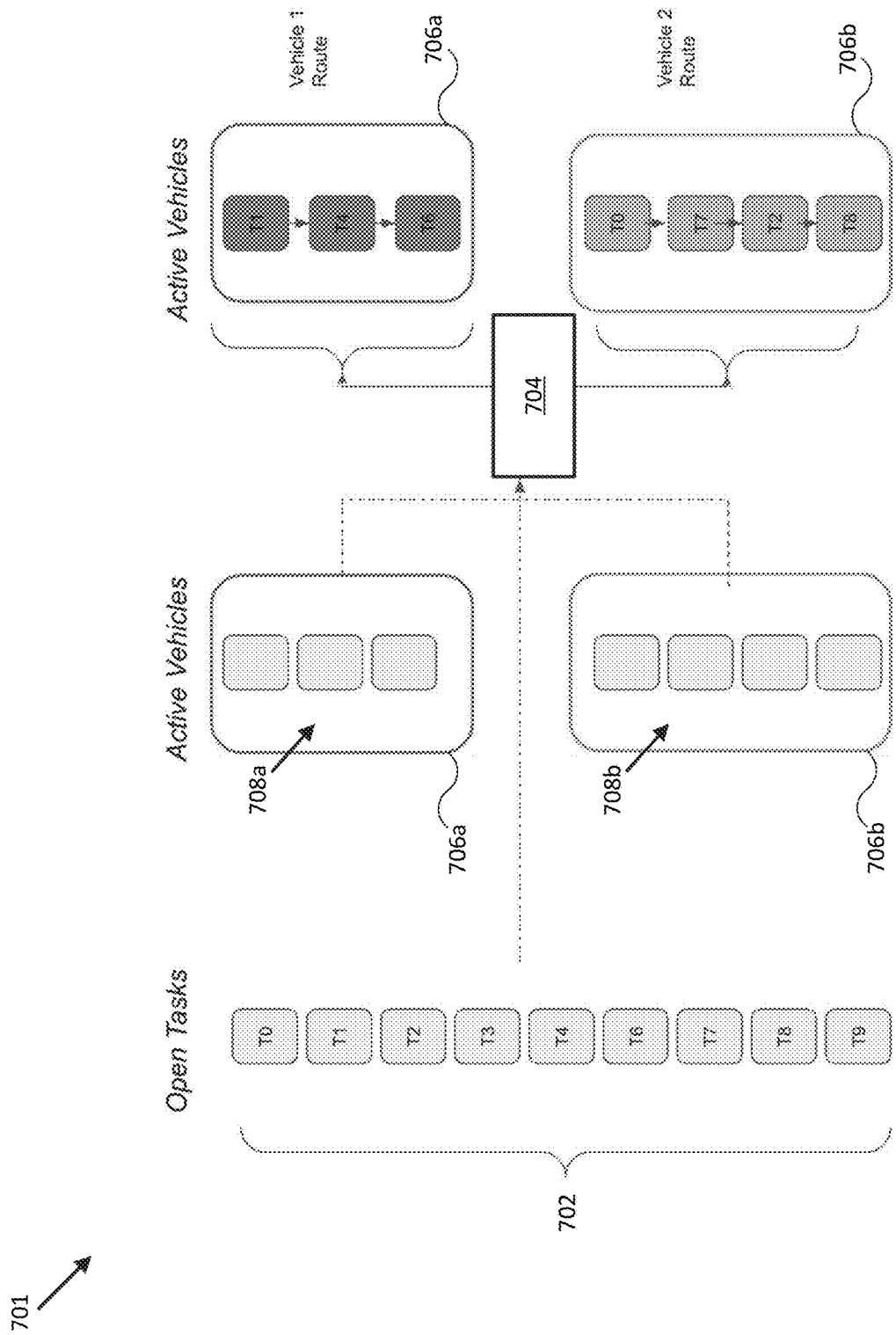

In example 701 shown in FIG. 7B, based on constraints that technician vehicle 706a has a carrying capacity 708a of three and technician vehicle 706b has a carrying capacity 708b of four, the system 704 may prioritize tasks T1, T4, and T6 into an order to be executed by the technician corresponding to technician vehicle 706a and may prioritize tasks T0, T7, T2, and T8 into an order to be executed by the technician corresponding to technician vehicle 706b. In some embodiments, a technician task performance profile corresponding to each of the technicians of the technician vehicles 706a and 706b, technician shift durations for the technicians, and whether the final task for a technician should end at a warehouse depot may be constraints under which the system 704 constructs its prioritization of tasks 702 for each of the technician vehicles 706a and 706b.

It is noted that in some embodiments, as shown in example 701, constraints such as maximum carrying capacity between the technician vehicles 706a and 706b may require some tasks be suspended. The suspended tasks may be made available for the system 704 to consider in the future during task refresh instances where a navigational task route can be updated with different tasks as further discussed at block 608.

Continuing with block 606 of FIG. 6, in some embodiments, the system 704 may prioritize the tasks 702 with further constraints such as the geolocations of the tasks 702 relative to each other. The system may identify that some of the tasks 702 are closer to each other than others. In this regard, the values of the tasks 702 may be adjusted based on the relative geolocations of the tasks 702 as some tasks 702 that may have been initially valued lower may have a greater value from the sequence of the tasks 702. For example, execution of a first task may decrease the cost of executing a second nearby task (e.g., within a certain proximity) since minimal distance may be required to travel between the tasks, thus the second nearby task's value may be adjusted upward when the second nearby task is prioritized to be immediately following or preceding the first task.

Figure 7C:
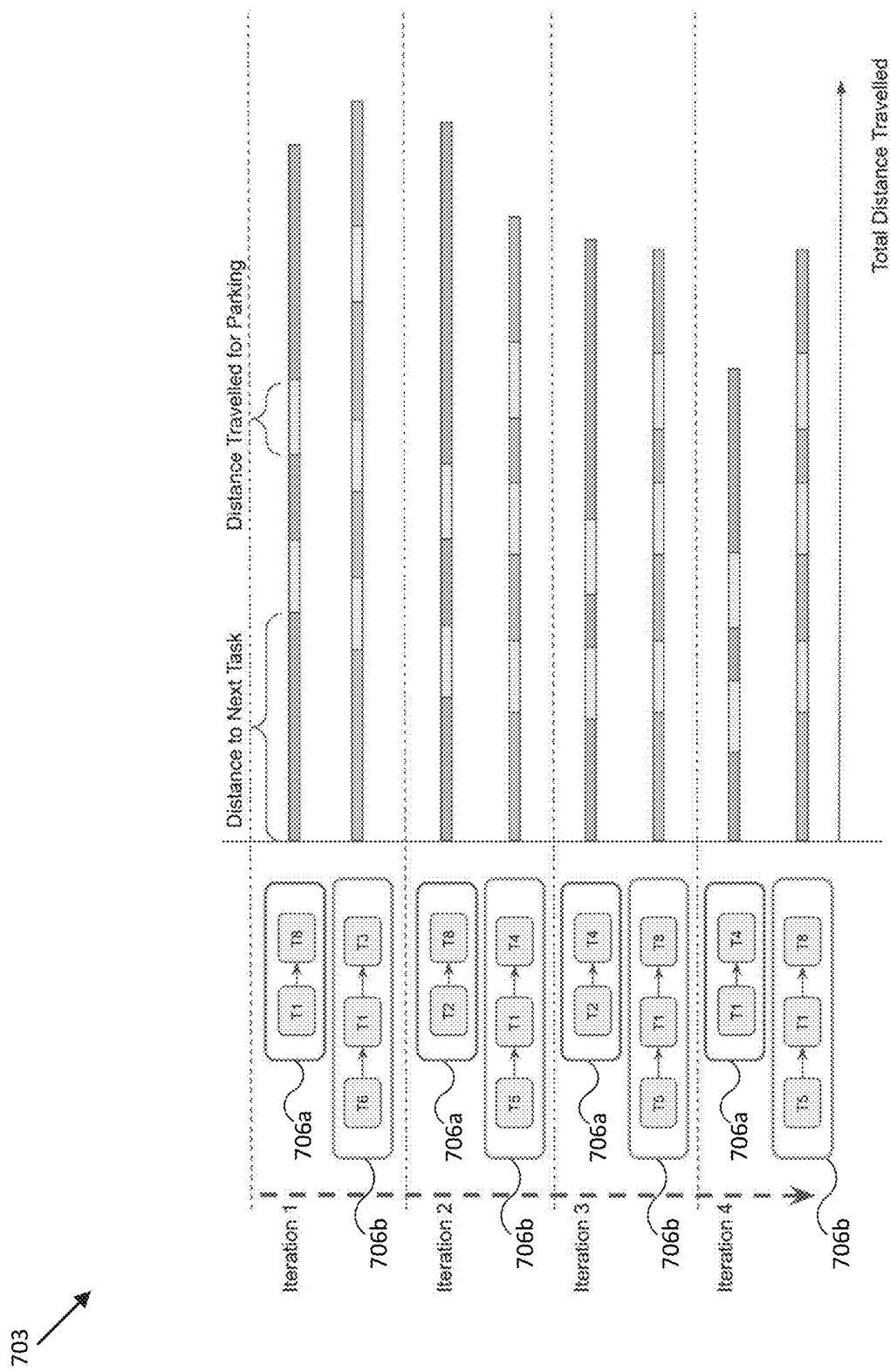

Thus, as shown in example 703 of FIG. 7C, the system may prioritize tasks T1-T8 to minimize distance traveled (e.g., distance between tasks and distance to park so that a task can be completed) based on a two-step approach that includes a construction heuristic and a Guided Local Search meta-heuristic. In some embodiments, the system may acquire the geolocations of each of the tasks to be executed to determine the distance between the tasks (e.g., distance measured in terms of navigable streets or paths) as well as the known distance required to park a technician vehicle to execute the task (e.g., the system may have access to historical data recorded by the system for previously completed tasks indicating how far from task locations that technicians have had to travel to park their vehicles in order to execute a task at the task location).

In the first step, the construction heuristic may iteratively build a solution by assigning new tasks to technician vehicles 706a and 706b at the lowest distance orders (e.g., adding a particular task to the technician vehicle that results in a least additional distance). At each insertion, a global object function may be evaluated and the move with the lowest increase in objective may be selected. In the second step, the solution found in the first step may be improved through a meta-heuristic such as a Guided Local Search to first augment the objective function of the problem to be minimized with a set of penalty terms. The penalty terms may be dynamically manipulated during the search process to guide the construction heuristic in a desired manner based on constraints. As shown in iteration 4, having technician vehicle 706a execute T1 and T4 while technician vehicle 706b executes T5, T1, and T8 reduces the total distance traveled between technician vehicles 706a and 706b and provides for the optimal value amongst the tasks T1-T8. It is noted that in example 703, the system has prioritized the tasks T1-T8 to have an optimal value with the constraints in such a way that T2, T3, and T6 have been selected to not be executed. However, T2, T3, and T6 may still be made available as open tasks that can later be recalled by the system when generating new task routes or updating current task routes as further discussed below at block 608. It is further noted that T1 in example 703 is shown as executed by both technician vehicles 706a and 706b, which may illustrate a case where a drop-off, move, and/or pick-up task at a certain location requires more carrying capacity than a single technician vehicle currently has.

In some embodiments, the values of the tasks may be adjusted in the prioritizing step based on the order of execution. In other words, the order in which tasks are prioritized may change the value of each of the individual tasks and consequently the total value from execution of all the tasks. For example, a pick-up task executed prior to a drop-off task may be adjusted to have less value as the pick-up task could require the micromobility transit vehicles be returned to the warehouse depot, which may require a technician to travel back to the warehouse depot and the micromobility transit vehicles may occupy space during the return back to the warehouse depot, which has an opportunity cost affecting later drop-off tasks. In some cases, a drop-off task executed prior to a move task may be adjusted to have more value as dropping off the micromobility transit vehicles may allow a technician vehicle to have more carrying capacity to execute the subsequent move task. In some embodiments, the system may adjust the values sufficiently during the prioritization such that drop-off, move, and pick-up tasks are ordered to maximize efficiency of carrying capacity of micromobility transit vehicles between tasks and minimize distance require to travel to complete the tasks. Thus, prioritizing the tasks may be based on a specific sequence of the type of tasks that are to be executed.

In further embodiments, the system 704 may prioritize the tasks 702 with a constraint that a final task geolocation be at or near a certain location such as a battery charging station or warehouse depot. Thus, the execution of the task may lead a technician to a convenient ending location such as for when a technician is ending a shift. In some embodiments, the prioritizing may have a constraint that requires minimal distance between the final task and the location of the battery charging station or warehouse depot.

Referring back to FIG. 6, at block 608, the system may generate a navigational task route(s) based on the prioritized one or more tasks. In some embodiments, navigational task routes may be assignable to a technician device corresponding to a technician for the execution of the prioritized tasks following the navigational task route. The system may automatically assign the generated navigational task routes to technicians according to various embodiments. The technician may receive the navigational task route and tasks thereof on a mobile device or onboard vehicle computing device. Prioritized tasks that have been included in the navigational task route may be considered routed by the system. A subset of the routed tasks may include an in-progress task, which may be a task that a technician has started but not completed such as when the technician begins driving to the task. Another subset of the routed tasks may include reserved tasks, which may be immediately upcoming tasks on a technician's task route (e.g., the next two immediately upcoming tasks).

At block 610, the system may monitor the task completion progress of the navigational task route. In one embodiment, the system may request status updates from the technician (e.g., mobile device or technician vehicle) regarding the completion of the tasks of the navigational task route. In some embodiments, the system may request status updates directly from the micromobility transit vehicles that are the subject of the tasks of the navigational task route. For example, where there are routed drop-off, move, and pick-up tasks, the system may track the GPS locations of the micromobility transit vehicles that are the subject of those tasks to determine the progress of the individual tasks and whether the task has been completed. As another example, for maintenance service tasks, the system may request a self-diagnosis from a micromobility transit vehicle that is the subject of the maintenance service task to determine whether the maintenance service task has been executed (e.g., a self-diagnosis status may change from requiring tire pressure service to the tire pressure is good). As another example, in a battery swap task, the system may request a battery charge level update from the micromobility transit vehicle that was the subject of the battery swap task to determine whether the battery swap has been completed (e.g., the battery charge level may update from low to high).

Figure 7D:
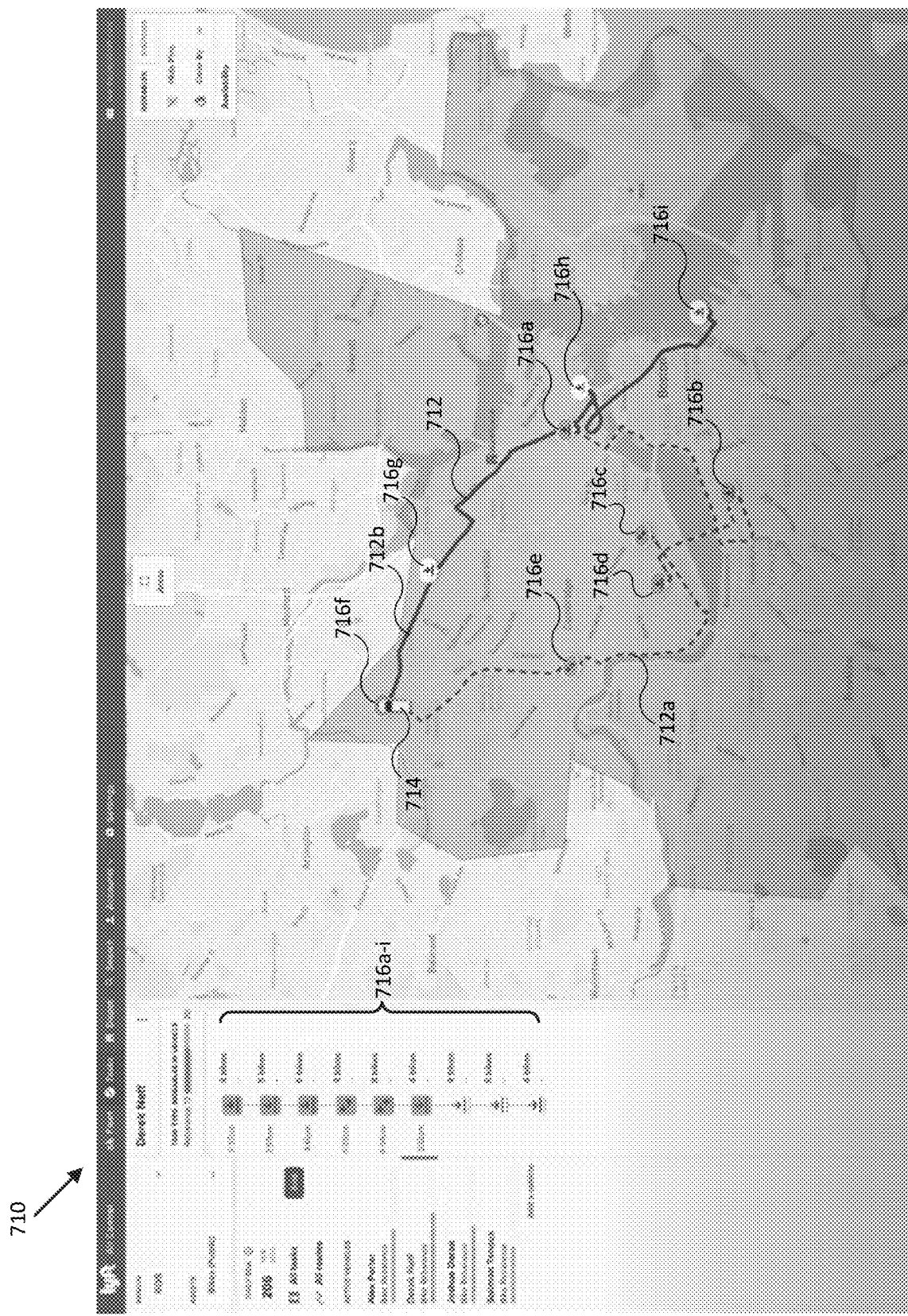
FIGS. 7D-7E illustrate example graphical user interfaces for monitoring progress of task routes in accordance with one or more embodiments of the present disclosure.

Referring to FIG. 7D, illustrated is a graphical user interface (GUI) 710 in which a fleet manager/servicer may view service tasks that need to be completed, view service tasks that are in progress, view available technicians who can perform the service tasks, view task routes that have been assigned to technicians, manually assign service tasks to technicians, view a map of a geographical area in which a fleet of micromobility transit vehicles are in operation, and interface with the above features to schedule and manage task operations. In an embodiment, the system may update the GUI 710 based on the monitored tasks at block 610 as well as the steps performed at other blocks of process 600.

Figure 7E:
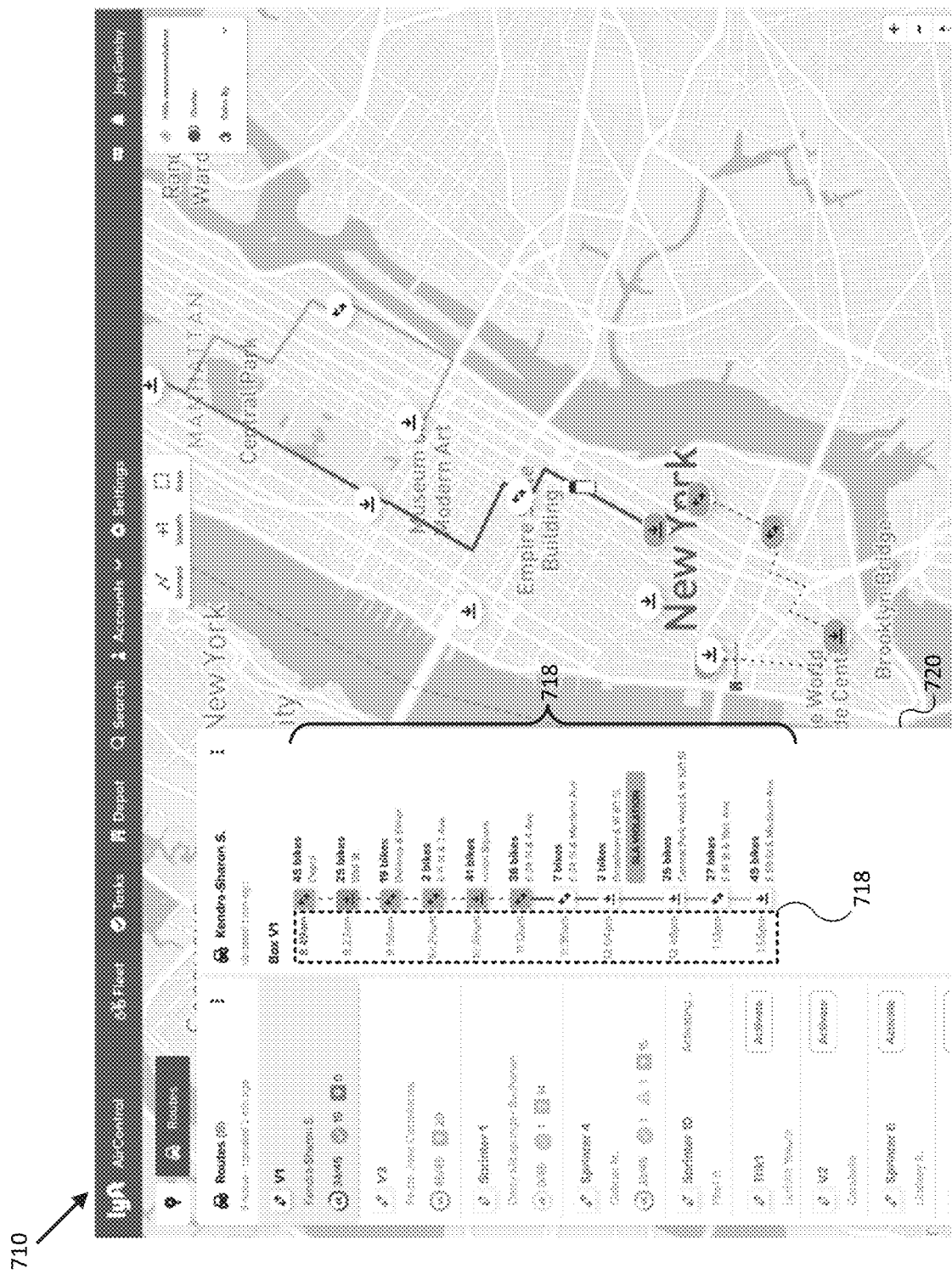

In the embodiment shown in FIG. 7D, the system may assign the generated navigational task route 712 to a technician named "Derek Neff" to execute the prioritized tasks 716a-i. The system may display a portion 712a of the navigational task route 712 corresponding to completed tasks 716a-f of the prioritized tasks 716a-i as a dotted line in the GUI 710. The system may also display a portion 712b of the navigational task route 712 corresponding to routed but uncompleted tasks 716g-i of the prioritized tasks 716a-i as a solid line in the GUI 710. As shown in the embodiment of FIG. 7E, prioritized tasks 718 in a pane 720 of the GUI 710 may include timestamps indicating when a task has been completed and an estimated time stamp for when future tasks may be completed based on estimated time to travel between tasks (e.g., acquired via Google Maps API) and time to complete the tasks (e.g., by reference to historic data indicating average time to complete certain tasks).

As shown in FIG. 7D, the technician may execute the tasks 716a-i, which have been prioritized into an order that provides the maximum (or optimized) total values of the tasks 716a-i based on the cost associated with an execution the task and a value generated from the execution of the task, such as an increase in the level of availability of micromobility transit vehicles for use by the public in dynamic transportation matching, with constraints such as a number of technician vehicles available in a geographical service area to execute the tasks 716a-i, a micromobility transit vehicle carrying capacity of each of the technician vehicles in the geographical service area, and the values of the tasks relative to each other adjusted during the prioritization based on the order of execution. In the embodiment shown in FIG. 7D, although the technician vehicle 714 may have started the execution of tasks 716a-i on the navigational task route 712 at task 716a, which is near task 716h, the system may have determined that executing tasks 716b-716g before executing task 716h would provide maximum total value from the execution of the tasks 716a-716h.

Referring back to FIG. 6, at block 612, the system may update the navigational task route. For example, the system may determine additional tasks to recommend be executed and create new tasks based on the recommendation. These newly created tasks may be made available to the system for refreshing task operations. For example, during a task refresh, the system may determine a present value for the newly created task and compare the value of the newly created task to the tasks on the navigational task route, which could change based on changing field conditions such as weather conditions, traffic conditions, unexpected delays in performing previous tasks, and so forth. Generally, the new tasks may be compared to the routed but not in-progress nor reserved tasks on the navigational task route as it may be more efficient for a technician to complete the in-progress or reserved tasks rather than be redirected. In some cases, where the inclusion of a new task would provide for a greater value in the routed tasks in the navigational task route, the system may replace a routed task with the new task. In other cases, the new task may be added to the navigational task route in a way that optimizes value without removing routed tasks. In some embodiments, the system may reevaluate a value of the routed tasks based on changing real-time conditions for the dynamic transportation matching system before determining to change the navigational task route. By updating the navigational task route based on real-time changing conditions, the present disclosure provides a dynamic solution that is flexible and optimizes the value and efficiency in executing the tasks.

In various embodiments, when updating the navigational task route, the system may evaluate adding tasks that previously were not selected to be executed based on one or more constraints or because the task initially did not have a value that exceeded a minimum threshold to be routed. For example, as previously discussed, where the current carrying capacity of technician vehicles does not allow for all tasks to be completed, those tasks that were selected to be omitted from execution may be reevaluated based on current carrying capacity conditions and current valuations of the tasks when updating the navigational task route as the carrying capacity of the technician vehicles as well as task values may change as a day progresses. Similarly, where some tasks do not have a great enough value to be prioritized into an order of execution (e.g., the determined value of the task at block 604 does not meet a minimum threshold warranting the execution of the task), the task may be suspended and reevaluated at a later time where changing field conditions may have increased the value of the task upon reevaluation (e.g., tradeoff between a cost associated with execution of the task and a value generated from the execution of the task balances to be a greater net positive value). For example, in some cases, the cost associated with the execution of a task that is near a navigational task route (or technician device GPS location) may drop low enough that the net value gained from the execution of the task warrants the execution of the task.

In further embodiments, the system may update the navigational task route with regard to estimated time arrivals for the tasks. For example, the system may iteratively predict estimated travel times between tasks in the navigational task route based on historic data related to the performance of the tasks, or similar tasks, as well as historic and current traffic congestion data (e.g., available through Google Maps APIs or tracking velocities of vehicles participating in a dynamic transportation system) and weather condition data. The estimated time arrivals may be iteratively forecasted for the time that a technician would be traveling between the tasks of the navigational task route. That is, the estimated time arrivals are not generated as of the current state of estimated time arrivals between tasks but rather are forecasted estimated time arrivals as of the time that the technician would be traveling between two tasks on the navigational task route according to the previous iteration of estimated time arrivals. In this regard, the system may resolve and improve on an initial solution as iteration on time-dependent inputs becomes more accurate and allows for convergence to an accurate solution over time. In one embodiment, the reserved tasks on the navigational task route may be omitted in the iterative estimation of time arrivals as they are more certain than later tasks on the navigational task route and are likely to be more accurate. If estimated time arrivals between tasks change, the task values may also change according to some embodiments. For example, where a task had more value upon a timely execution, the value may decay based on the length of time that passes before a technician can execute the task. Thus, in some cases, tasks that were not previously included in the navigational task route may be added to the navigational task route when changing estimated time arrivals lead to more value in the task relative to tasks that were already in the navigational task route. In some embodiments, the system may reprioritize tasks based on this change in task values of the navigational task route.

Thus, the present disclosure provides techniques for a dynamic navigational task route that changes according to changing field conditions in operating a fleet of micromobility transit vehicles.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A micromobility transit vehicle task management system, comprising:
   a non-transitory memory;
   a graphical user interface; and
   one or more hardware processors coupled to the non-transitory memory and configured to read instructions from the non-transitory memory to cause the system to perform operations comprising:
   determining one or more tasks to be executed based on a level of availability of one or more micromobility transit vehicles;
   determining a value for each of the tasks based on a cost to perform the task and value generated by an increase in the level of availability of the one or more micromobility transit vehicles by an execution of the task;
   prioritizing the one or more tasks into an order of execution that maximizes a total of the values of the tasks, wherein the values of the tasks are adjusted in the prioritizing based on the order of the execution;
   generating a navigational task route based on the prioritized one or more tasks, the navigational task route assignable to a technician device for the execution of the prioritized tasks;
   displaying the navigational task route and each of the prioritized tasks along the navigational task route in the graphical user interface;
   receiving, for each of the prioritized tasks that are executed along the navigational task route, status updates from the technician device;
   tracking, for each of the prioritized tasks that are executed along the navigational task route, global position system (GPS) locations of a micromobility transit vehicle corresponding to the task; and
   updating the displayed navigational task route, current status of at least one of the prioritized tasks, or a current location of a micromobility transit vehicle corresponding to one of the prioritized tasks in the graphical user interface based on the received status updates and the tracked GPS locations.

2. The micromobility transit vehicle task management system of claim 1, wherein the prioritizing the tasks is based on a number of technician devices associated with technicians in a geographical service area encompassing the tasks, a carrying capacity of a technician vehicle corresponding to the technician devices, a minimization of travel time between the tasks, or an estimated time to complete each of the tasks.

3. The micromobility transit vehicle task management system of claim 1, wherein:
   the operations further comprise predicting, for each of the tasks, a demand for micromobility transit vehicles at a location corresponding to each task based on historic user ride request demand, a current time of day, real-time and historic traffic data, and/or real-time weather data; and
   the determining the value for each of the tasks is based further on the predicted demand.

4. The micromobility transit vehicle task management system of claim 1, wherein the prioritizing the one or more tasks into the order of execution comprises:
   determining the order of execution that minimizes a travel time required to complete each of the tasks and maximizes the total of the values of the tasks.

5. The micromobility transit vehicle task management system of claim 1, wherein the operations further comprise monitoring a status of each of the tasks that are executed along the navigational task route via status updates received from a micromobility transit vehicle corresponding to each of the tasks that are executed.

6. The micromobility transit vehicle task management system of claim 5, wherein the operations further comprise adjusting the displayed navigational task route and the status of at least one of the prioritized tasks corresponding to the navigational task route based on the received status updates from the micromobility transit vehicle.

7. The micromobility transit vehicle task management system of claim 1, wherein the operations further comprise:
   determining one or more new tasks to be executed based on the availability of the one or more micromobility transit vehicles while the execution of the prioritized tasks in the navigational task route is in progress; and
   updating the navigational task route to include the one or more new tasks while the execution of the prioritized tasks is in progress.

8. The micromobility transit vehicle task management system of claim 1, wherein each of the one or more tasks is a move task, a drop-off task, a pick-up task, a battery swap task, or a service maintenance task.

9. The micromobility transit vehicle task management system of claim 1, wherein the determining the one or more tasks to be executed based on the availability of the one or more micromobility transit vehicles comprises:
   calculating an arrival rate of micromobility transit vehicles at a first station and a departure rate of micromobility transit vehicles at the first station;
   calculating an arrival rate of micromobility transit vehicles at a second station and a departure rate of micromobility transit vehicles at the second station; and
   based on the calculated arrival rate and departure rate of micromobility transit vehicles at the first station and the calculated arrival rate and departure rate of micromobility transit vehicles at the second station, determining that a move task at the first station and a drop-off task at the second station are to be executed to provide a greater availability of the one or more micromobility transit vehicles.

10. The micromobility transit vehicle task management system of claim 1, wherein the operations further comprise acquiring a technician task performance profile associated with the technician device, wherein the prioritizing the one or more tasks into the order of execution that maximizes the total values of the tasks is based on the technician task performance profile.

11. A method for micromobility transit vehicle task management, comprising:
   determining a plurality of tasks to be executed based on a level of availability of one or more micromobility transit vehicles participating in a dynamic transportation matching system;
   determining a value for each of the tasks based on a cost to perform the task and an increase in the level of availability of the one or more micromobility transit vehicles by an execution of the task;
   selecting one or more tasks, from the plurality of tasks, that exceed a threshold value warranting the execution of the one or more tasks;
   prioritizing the one or more tasks into an order of execution that maximizes a total of the values of the tasks, wherein the values of the tasks are adjusted in the prioritizing based on the order of the execution;

generating a navigational task route based on the prioritized one or more tasks, the navigational task route assignable to a technician device for the execution of the prioritized tasks;

displaying the navigational task route and each of the prioritized tasks along the navigational task route in a graphical user interface associated with the micromobility transit vehicle task management system;

receiving, for each of the prioritized tasks that are executed along the navigational task route, status updates from the technician device;

tracking, for each of the prioritized tasks that are executed along the navigational task route, global position system (GPS) locations of a micromobility transit vehicle corresponding to the task; and updating the displayed navigational task route, current status of at least one of the prioritized tasks, or a current location of a micromobility transit vehicle corresponding to one of the prioritized tasks in the graphical user interface based on the received status updates and the tracked GPS locations.

12. The method of claim 11, wherein the prioritizing the one or more tasks into the order of execution that maximizes the total of the values of the tasks is based on a number of technician vehicles available to execute the one or more tasks and a micromobility transit vehicle carrying capacity of each of the technician vehicles.

13. The method of claim 12, wherein the prioritizing the one or more tasks into the order of execution that maximizes the total of the values of the tasks includes omitting at least one of the one or more tasks from the order based on the number of technician vehicles available to execute the one or more tasks and the micromobility transit vehicle carrying capacity of each of the technician vehicles.

14. The method of claim 12, wherein the method further comprises:
generating a plurality of navigational task routes, one of which is the navigational task route, based on the prioritized one or more tasks; and
assigning each navigational task route to a technician device corresponding to one of the technician vehicles for execution of the prioritized tasks in the assigned navigational task route, wherein the order of execution that maximizes the total of the values of the tasks is an order that maximizes a number of tasks assigned to each technician device and minimizes a distance to travel between the tasks for each navigational task route.

15. The method of claim 11, further comprising:
acquiring a technician task performance profile associated with the technician device, wherein the prioritizing the one or more tasks into the order of execution that maximizes the total values of the tasks is based on the technician task performance profile.

16. A non-transitory machine-readable medium having stored thereon machine-readable instructions executable to cause a machine to perform operations comprising:

determining one or more tasks to be executed based on a level of availability of one or more micromobility transit vehicles participating in a dynamic transportation matching system that includes the machine;

determining a value for each of the tasks based on a cost to perform the task and an increase in the availability of the one or more micromobility transit vehicles by an execution of the task;

prioritizing the one or more tasks into an order of execution that maximizes a total of the values of the tasks, wherein the values of the tasks are adjusted in the prioritizing based on the order of the execution;

generating a plurality of navigational task routes based on the prioritized one or more tasks, each of the navigational task routes assignable to one of a plurality of technician devices for the execution of the prioritized tasks;

displaying a first navigational task route among the plurality of navigational task routes and each of the prioritized tasks along the first navigational task route in a graphical user interface associated with the machine;

receiving, for each of the prioritized tasks that are executed along the first navigational task route, status updates from the technician device;

tracking, for each of the prioritized tasks that are executed along the first navigational task route, global position system (GPS) locations of a micromobility transit vehicle corresponding to the task; and updating the displayed first navigational task route, current status of at least one of the prioritized tasks, or a current location of a micromobility transit vehicle corresponding to one of the prioritized tasks in the graphical user interface based on the received status updates and the tracked GPS locations.

17. The non-transitory machine-readable medium of claim 16, wherein the operations further comprise:
monitoring a task completion progress of the plurality of navigational task routes by receiving periodic status updates from one or more micromobility transit vehicles that are subjects of the prioritized tasks.

18. The non-transitory machine-readable medium of claim 16, wherein the operations further comprise determining a location for each of the plurality of technician devices within a geofence, wherein the prioritizing the one or more tasks into the order of execution that maximizes the total of the values of the tasks is based on the location corresponding to each of the plurality of technician devices.

19. The non-transitory machine-readable medium of claim 16, wherein the operations further comprise assigning at least one of the navigational task routes to at least one of the technician devices.

20. The non-transitory machine-readable of claim 16, wherein the cost to perform the task comprises a distance to travel to the task and a time to complete the task.

* * * * *